(12) United States Patent
Rubin et al.

(10) Patent No.: US 12,697,777 B2
(45) Date of Patent: Aug. 4, 2026

(54) METHOD AND SYSTEM FOR EXTENDED THREE-DIMENSIONAL PRINTING

(71) Applicant: Stratasys Ltd., Rehovot (IL)

(72) Inventors: Shmuel Rubin, Moshav Tkuma (IL); Kiril Lain, Rehovot (IL); Dan Mordechay, Mazkeret Batya (IL); Barak Glassman, Ness Ziona (IL); Eliyahu Tsubery, Gan Yavne (IL)

(73) Assignee: Stratasys Ltd., Rehovot (IL)

( * ) Notice: Subject to any disclaimer, the term of this patent is extended or adjusted under 35 U.S.C. 154(b) by 300 days.

(21) Appl. No.: 18/570,146

(22) PCT Filed: Jun. 15, 2022

(86) PCT No.: PCT/IL2022/050641
§ 371 (c)(1),
(2) Date: Dec. 14, 2023

(87) PCT Pub. No.: WO2022/264141
PCT Pub. Date: Dec. 22, 2022

(65) Prior Publication Data
US 2024/0286358 A1 Aug. 29, 2024

Related U.S. Application Data

(60) Provisional application No. 63/210,515, filed on Jun. 15, 2021.

(51) Int. Cl.
*B29C 64/386* (2017.01)
*B29C 64/336* (2017.01)
(Continued)

(52) U.S. Cl.
CPC .......... *B29C 64/386* (2017.08); *B29C 64/336* (2017.08); *B33Y 10/00* (2014.12); *B33Y 30/00* (2014.12); *B33Y 50/00* (2014.12)

(58) Field of Classification Search
USPC ........................................................ 700/119
See application file for complete search history.

(56) References Cited

U.S. PATENT DOCUMENTS

| | | | |
|---|---|---|---|
| 6,259,962 B1 | 7/2001 | Gothait | |
| 6,569,373 B2 | 5/2003 | Napadensky | |
| (Continued) | | | |

FOREIGN PATENT DOCUMENTS

| | | | | |
|---|---|---|---|---|
| JP | 2004227475 A | * | 8/2004 | |
| JP | 2012028660 A | * | 2/2012 | |
| (Continued) | | | | |

OTHER PUBLICATIONS

International Preliminary Report on Patentability Dated Dec. 28, 2023 From the International Bureau of WIPO Re. Application No. PCT/IL2022/050641 (15 Pages).
(Continued)

*Primary Examiner* — Hien D Khuu

(57) ABSTRACT

A system for three-dimensional printing comprises: a three-dimensional printing apparatus for printing an object using a building material supplied from a container, and a computer. The computer is configured to receive working hours of personnel operating the apparatus, to calculate, based on three-dimensional printing data describing the object, a supply period during which the container is expected to be emptied, and to transmit to the apparatus a signal to initiate the printing at a delayed time selected to ensure that an end time of the supply period is within the working hours.

18 Claims, 15 Drawing Sheets

(51) Int. Cl.

| | | |
|---|---|---|
| *B33Y 10/00* | (2015.01) | |
| *B33Y 30/00* | (2015.01) | |
| *B33Y 50/00* | (2015.01) | |

(56) References Cited

U.S. PATENT DOCUMENTS

| | | | |
|---|---|---|---|
| 6,658,314 | B1 | 12/2003 | Gothait et al. |
| 6,850,334 | B1 | 2/2005 | Gothait |
| 7,183,335 | B2 | 2/2007 | Napadensky |
| 7,209,797 | B2 | 4/2007 | Kritchman et al. |
| 7,225,045 | B2 | 5/2007 | Gothait et al. |
| 7,300,619 | B2 | 11/2007 | Napadensky et al. |
| 7,479,510 | B2 | 1/2009 | Napadensky et al. |
| 7,500,846 | B2 | 3/2009 | Eshed et al. |
| 7,962,237 | B2 | 6/2011 | Kritchman |
| 8,784,723 | B2 | 7/2014 | Napadensky |
| 9,031,680 | B2 | 5/2015 | Napadensky |
| 9,718,238 | B2 | 8/2017 | Teken |
| 2006/0044585 | A1* | 3/2006 | Kaneko ................. G06F 3/1205 358/1.13 |
| 2006/0227373 | A1 | 10/2006 | Matoba |
| 2009/0204477 | A1 | 8/2009 | Urso |
| 2017/0173886 | A1 | 6/2017 | Menchik et al. |
| 2018/0201021 | A1 | 7/2018 | Beaver et al. |
| 2019/0193405 | A1 | 6/2019 | Suzuki et al. |
| 2020/0404818 | A1* | 12/2020 | Matsushita ........ H05K 13/0417 |
| 2021/0173602 | A1* | 6/2021 | Ohkawa ............... G06F 9/4887 |

FOREIGN PATENT DOCUMENTS

| | | |
|---|---|---|
| JP | 2012-213989 | 11/2012 |
| JP | 2013-067018 | 4/2013 |
| JP | 2014-231211 | 12/2014 |
| JP | 2016-137667 | 8/2016 |
| JP | 2016-190422 | 11/2016 |
| KR | 10-2018-0118359 | 10/2018 |
| WO | WO 2016/009426 | 1/2016 |
| WO | WO 2019/005708 | 1/2019 |
| WO | WO 2021/093476 | 5/2021 |
| WO | WO 2022/264141 | 12/2022 |

OTHER PUBLICATIONS

International Search Report and the Written Opinion Dated Nov. 21, 2022 From the International Searching Authority Re. Application No. PCT/IL2022/050641. (70 Pages).

Invitation to Pay Additional Fees, Communication Relating to the Results of the Partial International Search and the Provisional Opinion Dated Aug. 22, 2022 From the International Searching Authority Re. Application No. PCT/IL2022/050641. (9 Pages).

Notice of Reason(s) for Rejection Dated Mar. 3, 2026 From the Japan Patent Office Re. Application No. 2023-576126 and Its Translation Into English. (6 Pages).

Office Action Dated Mar. 25, 2026 From the Israel Patent Office Re. Application No. 309417. (4 Pages).

* cited by examiner

FIG. 2A                    FIG. 2B

FIG. 5A
FIG. 5B
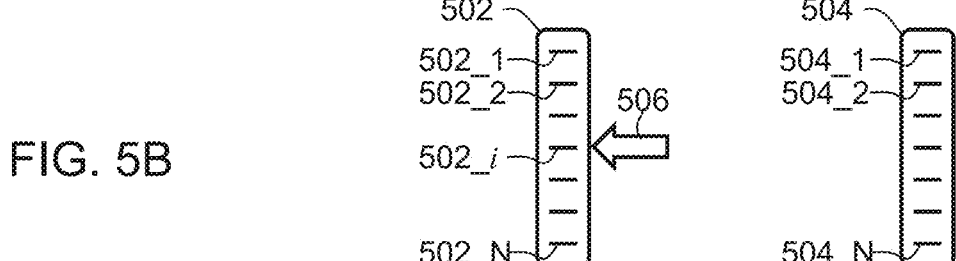
FIG. 5C
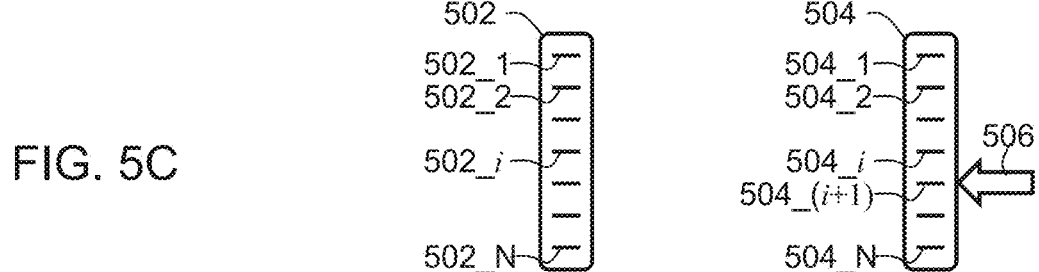

METHOD AND SYSTEM FOR EXTENDED THREE-DIMENSIONAL PRINTING

RELATED APPLICATION APPLICATIONS

This application is a National Phase of PCT Patent Application No. PCT/IL2022/050641 having International filing date of Jun. 15, 2022, which claims the benefit of priority under 35 USC § 119(e) of U.S. Provisional Patent Application No. 63/210,515 filed on Jun. 15, 2021. The contents of the above applications are all incorporated by reference as if fully set forth herein in their entirety.

FIELD AND BACKGROUND OF THE INVENTION

The present invention, in some embodiments thereof, relates to additive manufacturing and, more particularly, but not exclusively, to a method and system for extended three-dimensional printing.

Additive manufacturing (AM) is a technology enabling fabrication of arbitrarily shaped structures directly from computer data via additive formation steps. The basic operation of any AM system consists of slicing a three-dimensional computer model into thin cross sections, translating the result into two-dimensional position data and feeding the data to control equipment which fabricates a three-dimensional structure in a layerwise manner.

Additive manufacturing entails many different approaches to the method of fabrication, including three-dimensional (3D) printing such as 3D inkjet printing. 3D inkjet printing is performed by a layer by layer inkjet deposition of building materials. Thus, a building material is dispensed from a dispensing head having a set of nozzles to deposit layers on a supporting structure. The layers are then leveled by a leveling device, and cured or solidified.

Various three-dimensional printing techniques exist and are disclosed in, e.g., U.S. Pat. Nos. 6,259,962, 6,569,373, 6,658,314, 6,850,334, 7,183,335, 7,209,797, 7,225,045, 7,300,619, 7,479,510, 7,500,846, 7,962,237, 8,784,723, 9,031,680, 9,718,238, and International Patent Publication No. WO2016/009426, all of the same Assignee, the contents of which are hereby incorporated by reference.

SUMMARY OF THE INVENTION

According to an aspect of some embodiments of the present invention there is provided a system for three-dimensional printing. The system comprises: a three-dimensional printing apparatus configured for printing an object using a building material supplied from a container; and a computer, configured to receive working hours of personnel operating the apparatus, to calculate, based on three-dimensional printing data describing the object, a supply period during which the container is expected to be emptied, and to transmit to the apparatus a signal to initiate the printing at a delayed time selected to ensure that an end time of the supply period is within the working hours.

According to some embodiments of the invention the computer is configured to calculate the supply period based on a predetermined total amount of material in the container.

According to some embodiments of the invention the computer is configured to receive input pertaining to an amount of material in the container, and to calculate the supply period based on the input amount.

According to some embodiments of the invention the computer is configured to receive the input via a user interface.

According to some embodiments of the invention the computer is configured to receive from the apparatus a signal indicative of the amount.

According to some embodiments of the invention the apparatus comprises a plurality of containers, each supplying a different building material, wherein the computer is configured to calculate a supply period, separately for each container, thereby providing a plurality of supply periods, and to transmit to the apparatus a signal to initiate the printing at a delayed time selected to ensure that an end time of each of the supply periods is within the working hours.

According to an aspect of some embodiments of the present invention there is provided a method for three-dimensional printing. The method comprises: receiving working hours of personnel operating a three-dimensional printing apparatus having a building material container; receiving three-dimensional printing data describing an object; calculating based on the data, a supply period during which the container is expected to be emptied; transmitting to the apparatus a signal to initiate printing of the object at a delayed time selected to ensure that an end time of the supply period is within the working hours.

According to some embodiments of the invention the calculation of the supply period is based on a predetermined total amount of material in the container.

According to some embodiments of the method comprises receiving input pertaining to an amount of material in the container, wherein the calculating the supply period is based on the input amount.

According to some embodiments of the invention the input is received by a user interface. According to some embodiments of the invention the input is received from the apparatus as a signal indicative of the amount.

According to some embodiments of the invention the apparatus comprises a plurality of containers, each supplying a different building material, and wherein the method comprises calculating a supply period, separately for each container, thereby providing a plurality of supply periods, and transmitting to the apparatus a signal to initiate printing at a delayed time selected to ensure that an end time of each of the supply periods is within the working hours.

According to an aspect of some embodiments of the present invention there is provided a system for three-dimensional printing. The system comprises: at least one printing nozzle; a plurality of modeling material containers; and a controller configured to execute a series of printing instruction batches to control the printing nozzle to dispense patterns of modeling material according to a shape of an object, wherein each batch is associated with one of the containers but not with any other of the containers, and wherein no batch is executed before a container associated with a previously executed batch is emptied.

According to some embodiments of the invention the controller is configured to select between a first printing mode at which the series of printing instruction batches is executed, and a second printing mode at which at least one of the containers supplies modeling material before another one of the containers is empty.

According to some embodiments of the invention the controller is configured to automatically select the first mode when the modeling material containers comprise the same modeling material.

According to some embodiments of the invention the controller is configured to automatically select the second mode when the modeling material containers different modeling materials.

According to some embodiments of the invention the controller is configured to select between the first and the second printing modes based on a user input.

According to some embodiments of the invention the system comprises a plurality of separate nozzle arrays, each separately connected to a single container of the containers, wherein each batch comprise printing instructions for the controller to operate a single nozzle array.

According to an aspect of some embodiments of the present invention there is provided a method of three-dimensional printing. The method comprises: selecting a container of a plurality of modeling material containers; executing a batch of printing instructions to control at least one printing nozzle to dispense modeling material from the selected container in patterns corresponding to a shape of an object; and when the selected container is empty, selecting another container from the plurality of modeling material containers, and repeating the execution of the batch of printing instructions for the other container.

According to some embodiments of the invention the method comprises selecting between a first printing mode at which the batch of printing instructions is executed separately for each container, and a second printing mode at which at least one of the containers supplies modeling material before another one of the containers is empty.

According to some embodiments of the invention the method comprises automatically selecting the first mode when the modeling material containers comprise the same modeling material.

According to some embodiments of the invention the method comprises automatically selecting the second mode when the modeling material containers different modeling materials.

According to some embodiments of the invention the selection between the first and the second printing modes is based on a user input.

According to some embodiments of the invention there is a plurality of separate nozzle arrays, each separately connected to a single container of the containers, wherein each batch comprise printing instructions for operating a single nozzle array.

According to an aspect of some embodiments of the present invention there is provided a system for three-dimensional printing. The system comprises: a rotary tray configured to rotate about a vertical axis; a printing head; a controller configured to control the printing head to dispense onto the tray layers of building materials, each layer being patterned according to a slice of an object, and to select a constant rotation speed of the tray for at least one layer based on a radial position of a portion of a pattern corresponding to the layer.

According to some embodiments of the invention the portion comprises a voxel which is farthest from the vertical axis among all voxels of the pattern.

According to some embodiments of the invention the controller configured to reselect the constant rotation speed a plurality of times, each time for a different layer.

According to some embodiments of the invention the controller configured to reselect the constant rotation speed every N dispensed layers, N being a positive integer.

According to some embodiments of the invention the controller is configured to select the constant rotation speed to ensure that a linear speed at the radial position is equal to, or less than, a predetermined linear speed threshold.

According to some embodiments of the invention the system comprises a computer configured to receive three-dimensional data describing a shape of the object, to generate, based on the three-dimensional data, slice data defined in a coordinate system corresponding to the rotary tray and describing a plurality of slices of the object oriented such that higher portions of the object are closer to the vertical axis than lower portions of the object, and to transmit the slice data to the controller.

According to an aspect of some embodiments of the present invention there is provided a method of printing a three-dimensional object. The method comprises: dispensing onto a rotating tray layers of building materials, each layer being patterned according to a slice of the object; and for at least one layer, selecting a constant rotation speed of the tray based on a radial position of a portion of a pattern corresponding to the layer.

According to some embodiments of the invention the portion comprises a voxel which is farthest from a vertical rotation axis of the rotating tray among all voxels of the pattern.

According to some embodiments of the invention the method comprises reselecting the constant rotation speed a plurality of times, each time for a different layer.

According to some embodiments of the invention the method comprises reselecting the constant rotation speed every N dispensed layers, N being a positive integer.

According to some embodiments of the invention the selection of the constant rotation speed is executed so as to ensure that a linear speed at the radial position is equal to, or less than, a predetermined linear speed threshold.

According to some embodiments of the invention the method comprises: receiving three-dimensional data describing a shape of the object; and generating, based on the three-dimensional data, slice data defined in a coordinate system corresponding to the rotary tray and describing a plurality of slices of the object oriented such that higher portions of the object are closer to a rotation axis of the tray than lower portions of the object.

According to an aspect of some embodiments of the present invention there is provided an integrated circuit for testing a printing head board of a three-dimensional printing system. The integrated circuit comprises: an edge connector comparable with, and being detachably connectable to, a socket on the printing head board; circuitry configured for automatically switching the printing head board to a testing mode at which a printing head controlled by the printing head board is not dispensing material, for transmitting test signals to the printing head board, and for receiving response signals from the printing head board; and a visible indication panel, for generating optical signals pertaining to a condition of the printing head board based on the response signals.

According to some embodiments of the invention the optical signals are indicative of a pin number of the socket that is associated with a potentially faulty component of the board.

According to some embodiments of the invention the circuitry is configured for transmitting a test signal to at least one thermistor on the board.

According to some embodiments of the invention the circuitry is configured for transmitting a test signal to at least one memory medium on the board.

According to some embodiments of the invention the circuitry is configured for transmitting a test signal to at least one heating element on the board.

According to some embodiments of the invention the circuitry is configured for transmitting a test signal mimicking a voltage supply to the board.

According to some embodiments of the invention the circuitry is configured for transmitting a test signal mimicking a dispensing pulse to the board.

According to some embodiments of the invention the circuitry is configured for transmitting a test signal mimicking a data signal to the board.

According to an aspect of some embodiments of the present invention there is provided a waste cartridge nest for a three-dimensional printing system. The waste cartridge nest comprises a cartridge latching member for latching a waste cartridge in the nest once the cartridge is pushed forward into the nest, and an inlet port engagement member carrying a fluid connector and constituted to sealingly engage an inlet port of the waste cartridge with the fluid connector, once the cartridge is pushed forward into the nest.

According to an aspect of some embodiments of the present invention there is provided a system for three-dimensional printing. The system comprises: a three-dimensional printing apparatus configured for printing a three-dimensional object using a building material; the waste cartridge nest as delineated above and optionally and preferably as further detailed below; and a waste cartridge latched into the nest.

According to some embodiments of the invention the waste cartridge comprises a cork compatible with the inlet port, and being temporarily mounted on a body of the waste cartridge at a location which is laterally displaced from the inlet port, while the waste cartridge is latched into the nest.

According to some embodiments of the invention the fluid connector is connected to a waste collection device of the apparatus, both when the waste cartridge occupies the nest and when the waste cartridge is pulled away from the nest.

According to some embodiments of the invention the waste collection device is a waste collecting bath of a leveling system.

According to some embodiments of the invention the waste collection device is a waste collecting bath of a service station system.

According to an aspect of some embodiments of the present invention there is provided a method of loading a waste cartridge to a three-dimensional printing system having the waste cartridge nest as delineated above and optionally and preferably as further detailed below, in embodiments in which the waste cartridge has an inlet port covered by a cork. The method comprises removing the cork from the inlet port, mounting the cork on a body of the waste cartridge at a location which is laterally displaced from the inlet port, and pushing the waste cartridge into the nest.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 2A-2C are schematic illustrations of printing heads according to some embodiments of the present invention;

FIGS. 5A-C are schematic illustrations of batches of printing instructions according to some embodiments of the present invention;

DESCRIPTION OF SPECIFIC EMBODIMENTS OF THE INVENTION

Figure 1A:
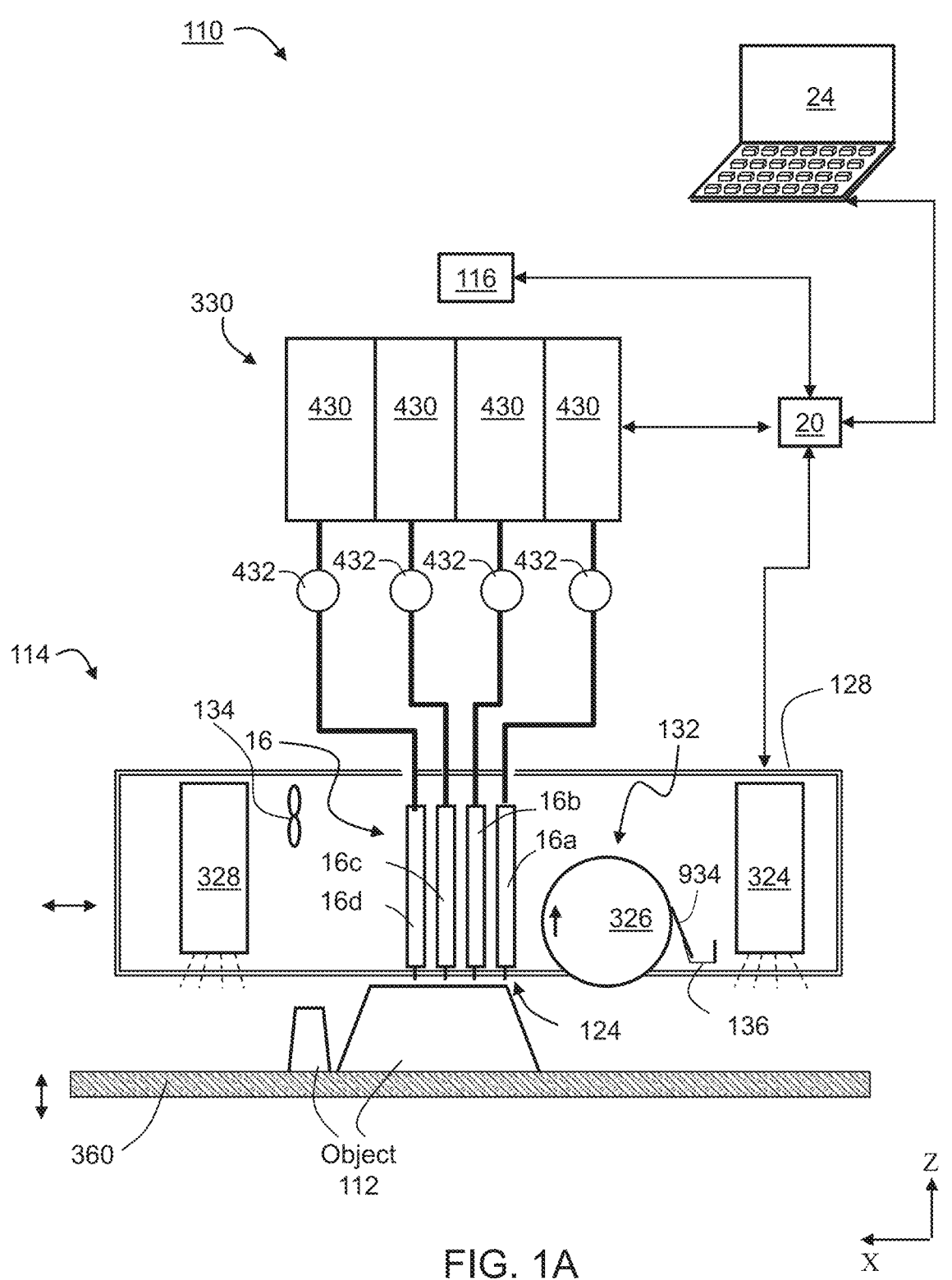
FIGS. 1A-D are schematic illustrations of an additive manufacturing system according to some embodiments of the invention.

The present invention, in some embodiments thereof, relates to additive manufacturing and, more particularly, but not exclusively, to a method and system for extended three-dimensional printing.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The method and system of the present embodiments manufacture three-dimensional objects based on computer object data in a layerwise manner by forming a plurality of layers in a configured pattern corresponding to the shape of the objects. The formation of the layers is optionally and preferably by printing, more preferably by inkjet printing. The computer object data can be in any known format, including, without limitation, a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY), 3D Manufacturing Format (3MF), Object file format (OBJ) or any other format suitable for Computer-Aided Design (CAD).

The term "object" as used herein refers to a whole three-dimensional object or a part thereof.

Each layer can be formed by an AM apparatus which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material formulation, and which type of building material formulation is to be delivered thereto. The decision is made according to a computer image of the surface.

In preferred embodiments of the present invention the AM comprises three-dimensional printing, more preferably three-dimensional inkjet printing. In these embodiments a building material is dispensed from a printing head having one or more arrays of nozzles to deposit building material in layers on a supporting structure. The AM apparatus thus dispenses building material in target locations which are to be occupied and leaves other target locations void. The apparatus typically includes a plurality of arrays of nozzles, each of which can be configured to dispense a different building material. This is typically achieved by providing the printing head with a plurality of fluid channels separated from each other, wherein each channel receives a different building material through a separate inlet and conveys it to a different array of nozzles.

Thus, different target locations can be occupied by different building material formulations. The types of building material formulations can be categorized into two major categories: modeling material formulation and support material formulation. The support material formulation serves as a supporting matrix or construction for supporting the object or object parts during the fabrication process and/or other purposes, e.g., providing hollow or porous objects. Support constructions may additionally include modeling material formulation elements, e.g. for further support strength.

The modeling material formulation is generally a composition which is formulated for use in additive manufacturing and which is able to form a three-dimensional object on its own, i.e., without having to be mixed or combined with any other substance.

The final three-dimensional object is made of the modeling material formulation or a combination of modeling material formulations or modeling and support material formulations or modification thereof (e.g., following curing). All these operations are well-known to those skilled in the art of solid freeform fabrication.

In some exemplary embodiments of the invention an object is manufactured by dispensing two or more different modeling material formulations, each material formulation from a different array of nozzles (belonging to the same or different printing heads) of the AM apparatus. In some embodiments, two or more such arrays of nozzles that dispense different modeling material formulations are both located in the same printing head of the AM apparatus. In some embodiments, arrays of nozzles that dispense different modeling material formulations are located in separate printing heads, for example, a first array of nozzles dispensing a first modeling material formulation is located in a first printing head, and a second array of nozzles dispensing a second modeling material formulation is located in a second printing head.

In some embodiments, an array of nozzles that dispense a modeling material formulation and an array of nozzles that dispense a support material formulation are both located in the same printing head. In some embodiments, an array of nozzles that dispense a modeling material formulation and an array of nozzles that dispense a support material formulation are located in separate printing heads.

Figure 2C:
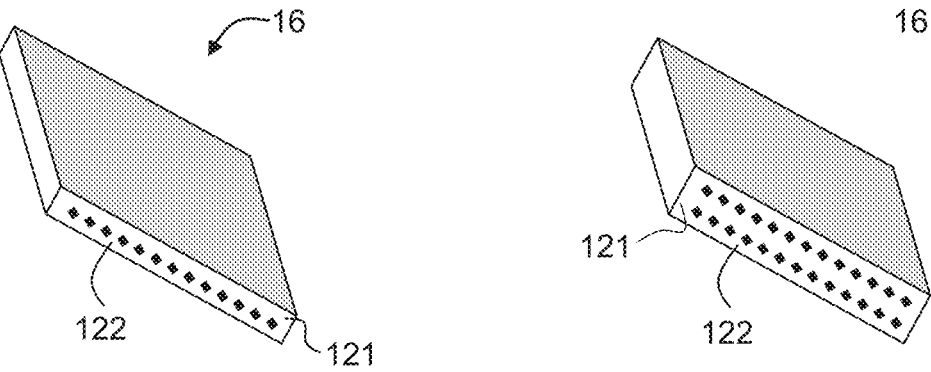
Figure 2C:
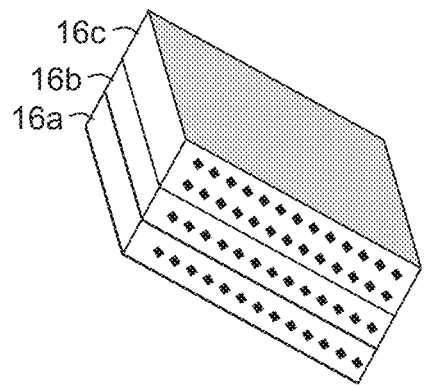

A representative and non-limiting example of a system 110 suitable for AM of an object 112 according to some embodiments of the present invention is illustrated in FIG. 1A. System 110 comprises an additive manufacturing apparatus 114 having a dispensing unit 16 which comprises a plurality of printing heads. Each head preferably comprises one or more arrays of nozzles 122, typically mounted on an orifice plate 121, as illustrated in FIGS. 2A-C described below, through which a liquid building material formulation 124 is dispensed.

Preferably, but not obligatorily, apparatus 114 is a three-dimensional printing apparatus, in which case the printing heads are printing heads, and the building material formulation is dispensed via inkjet technology. This need not necessarily be the case, since for some applications, it may not be necessary for the additive manufacturing apparatus to employ three-dimensional printing techniques. Representative examples of additive manufacturing apparatus contemplated according to various exemplary embodiments of the present invention include, without limitation, fused deposition modeling apparatus and fused material formulation deposition apparatus.

Each printing head is optionally and preferably fed via one or more building material formulation reservoirs which may optionally include a temperature control unit (e.g., a temperature sensor and/or a heating device), and a material formulation level sensor. To dispense the building material formulation, a voltage signal is applied to the printing heads to selectively deposit droplets of material formulation via the printing head nozzles, for example, as in piezoelectric inkjet printing technology. Another example includes thermal inkjet printing heads. In these types of heads, there are heater elements in thermal contact with the building material formulation, for heating the building material formulation to form gas bubbles therein, upon activation of the heater elements by a voltage signal. The gas bubbles generate pressures in the building material formulation, causing droplets of building material formulation to be ejected through the nozzles. Piezoelectric and thermal printing heads are known to those skilled in the art of solid freeform fabrication. For any types of inkjet printing heads, the dispensing rate of the head depends on the number of nozzles, the type of nozzles and the applied voltage signal rate (frequency).

Optionally, the overall number of dispensing nozzles or nozzle arrays is selected such that half of the dispensing nozzles are designated to dispense support material formulation and half of the dispensing nozzles are designated to dispense modeling material formulation, i.e. the number of nozzles jetting modeling material formulations is the same as the number of nozzles jetting support material formulation. In the representative example of FIG. 1A, four printing heads 16a, 16b, 16c and 16d are illustrated. Each of heads 16a, 16b, 16c and 16d has a nozzle array. In this Example, heads 16a and 16b can be designated for modeling material formulation/s and heads 16c and 16d can be designated for support material formulation. Thus, head 16a can dispense one modeling material formulation, head 16b can dispense another modeling material formulation and heads 16c and 16d can both dispense support material formulation. In an alternative embodiment, heads 16c and 16d, for example, may be combined in a single head having two nozzle arrays for depositing support material formulation. In a further alternative embodiment any one or more of the printing heads may have more than one nozzle arrays for depositing more than one material formulation, e.g. two nozzle arrays for depositing two different modeling material formulations or a modeling material formulation and a support material formulation, each formulation via a different array or number of nozzles.

Yet it is to be understood that it is not intended to limit the scope of the present invention and that the number of modeling material formulation printing heads (modeling heads) and the number of support material formulation printing heads (support heads) may differ. Generally, the number of arrays of nozzles that dispense modeling material formulation, the number of arrays of nozzles that dispense support material formulation, and the number of nozzles in each respective array are selected such as to provide a predetermined ratio, a, between the maximal dispensing rate of the support material formulation and the maximal dispensing rate of modeling material formulation. The value of the predetermined ratio, a, is preferably selected to ensure that in each formed layer, the height of modeling material formulation equals the height of support material formulation. Typical values for a are from about 0.6 to about 1.5.

As used herein throughout the term "about" refers to +10%.

For example, for α=1, the overall dispensing rate of support material formulation is generally the same as the overall dispensing rate of the modeling material formulation when all the arrays of nozzles operate.

Apparatus 114 can comprise, for example, M modeling heads each having m arrays of p nozzles, and S support heads each having s arrays of q nozzles such that M×m× p=S×s×q. Each of the M×m modeling arrays and S×s support arrays can be manufactured as a separate physical unit, which can be assembled and disassembled from the group of arrays. In this embodiment, each such array optionally and preferably comprises a temperature control unit and a material formulation level sensor of its own, and receives an individually controlled voltage for its operation.

Apparatus 114 can further comprise a solidifying device 324 which can include any device configured to emit light, heat or the like that may cause the deposited material formulation to harden. For example, solidifying device 324 can comprise one or more radiation sources, which can be, for example, an ultraviolet or visible or infrared lamp, or other sources of electromagnetic radiation, or electron beam source, depending on the modeling material formulation being used. In some embodiments of the present invention, solidifying device 324 serves for curing or solidifying the modeling material formulation.

In addition to solidifying device 324, apparatus 114 optionally and preferably comprises an additional radiation source 328 for solvent evaporation. Radiation source 328 optionally and preferably generates infrared radiation. In various exemplary embodiments of the invention solidifying device 324 comprises a radiation source generating ultraviolet radiation, and radiation source 328 generates infrared radiation.

In some embodiments of the present invention apparatus 114 comprises cooling system 134 such as one or more fans or the like The printing head(s) and radiation source are preferably mounted in a frame or block 128 which is preferably operative to reciprocally move over a tray 360, which serves as the working surface. In some embodiments of the present invention the radiation sources are mounted in the block such that they follow in the wake of the printing heads to at least partially cure or solidify the material formulations just dispensed by the printing heads. Tray 360 is positioned horizontally. According to the common conventions an X-Y-Z Cartesian coordinate system is selected such that the X-Y plane is parallel to tray 360. Tray 360 is preferably configured to move vertically (along the Z direction), typically downward. In various exemplary embodiments of the invention, apparatus 114 further comprises one or more leveling devices 32, e.g. a roller 326. Leveling device 326 serves to straighten, level and/or establish a thickness of the newly formed layer prior to the formation of the successive layer thereon. Leveling device 32 preferably comprises a waste collection device 136 for collecting the excess material formulation generated during leveling. Waste collection device 136 may comprise any mechanism that delivers the material formulation to a waste tank or waste cartridge.

In use, the printing heads of unit 16 move in a scanning direction, which is referred to herein as the X direction, and selectively dispense building material formulation in a predetermined configuration in the course of their passage over tray 360. The building material formulation typically comprises one or more types of support material formulation and one or more types of modeling material formulation. The passage of the printing heads of unit 16 is followed by the curing of the modeling material formulation(s) by radiation source 126. In the reverse passage of the heads, back to their starting point for the layer just deposited, an additional dispensing of building material formulation may be carried out, according to predetermined configuration. In the forward and/or reverse passages of the printing heads, the layer thus formed may be straightened by leveling device 32, which preferably follows the path of the printing heads in their forward and/or reverse movement. Once the printing heads return to their starting point along the X direction, they may move to another position along an indexing direction, referred to herein as the Y direction, and continue to build the same layer by reciprocal movement along the X direction. Alternately, the printing heads may move in the Y direction between forward and reverse movements or after more than one forward-reverse movement. The series of scans performed by the printing heads to complete a single layer is referred to herein as a single scan cycle.

Once the layer is completed, tray 360 is lowered in the Z direction to a predetermined Z level, according to the desired thickness of the layer subsequently to be printed. The procedure is repeated to form three-dimensional object 112 in a layerwise manner.

In another embodiment, tray 360 may be displaced in the Z direction between forward and reverse passages of the printing head of unit 16, within the layer. Such Z displacement is carried out in order to cause contact of the leveling device with the surface in one direction and prevent contact in the other direction.

The present embodiments contemplate use of a liquid material formulation supply system 330, which comprises one or more liquid material containers or cartridges 430, and which supplies the liquid material(s) to printing heads. Supply system 330 can be used in an AM system such as system 110, in which case the liquid material in each container is a building material.

A controller 20 controls fabrication apparatus 114 and optionally and preferably also supply system 330. Controller 20 typically includes an electronic circuit configured to perform the controlling operations. Controller 20 preferably communicates with a data processor 24 which transmits digital data pertaining to fabrication instructions based on computer object data, e.g., a CAD configuration represented on a computer readable medium in a form of a Standard Tessellation Language (STL) format or the like. Typically, controller 20 controls the voltage applied to each printing head or each nozzle array and the temperature of the building material formulation in the respective printing head or respective nozzle array.

Once the manufacturing data is loaded to controller 20 it can operate without user intervention. In some embodiments, controller 20 receives additional input from the operator, e.g., using data processor 24 or using a user interface 116 communicating with controller 20. User interface 116 can be of any type known in the art, such as, but not limited to, a keyboard, a touch screen and the like. For example, controller 20 can receive, as additional input, one or more building material formulation types and/or attributes, such as, but not limited to, color, characteristic distortion and/or transition temperature, viscosity, electrical property, magnetic property. Other attributes and groups of attributes are also contemplated.

Figures 1B, 1C:
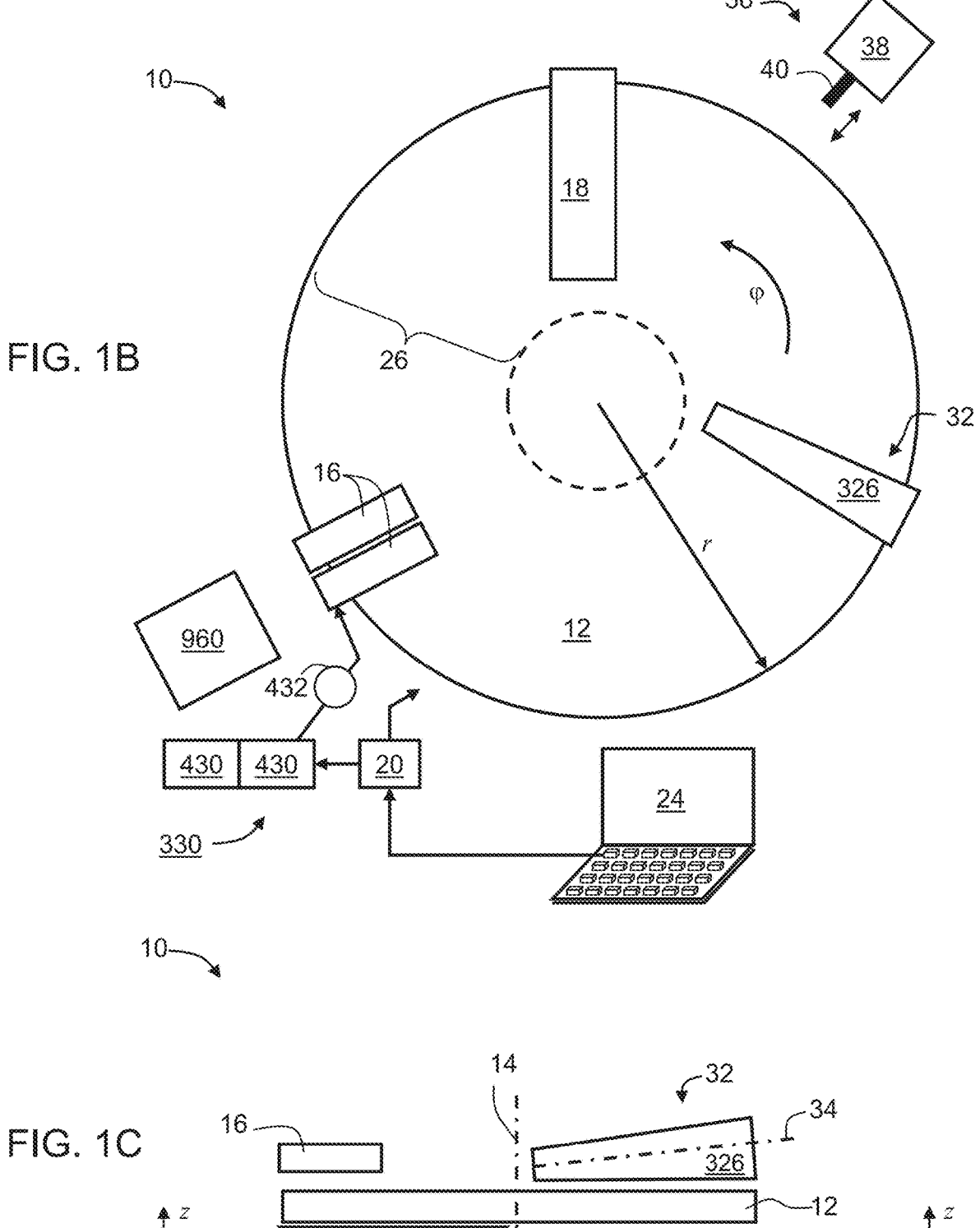
Figure 1D:
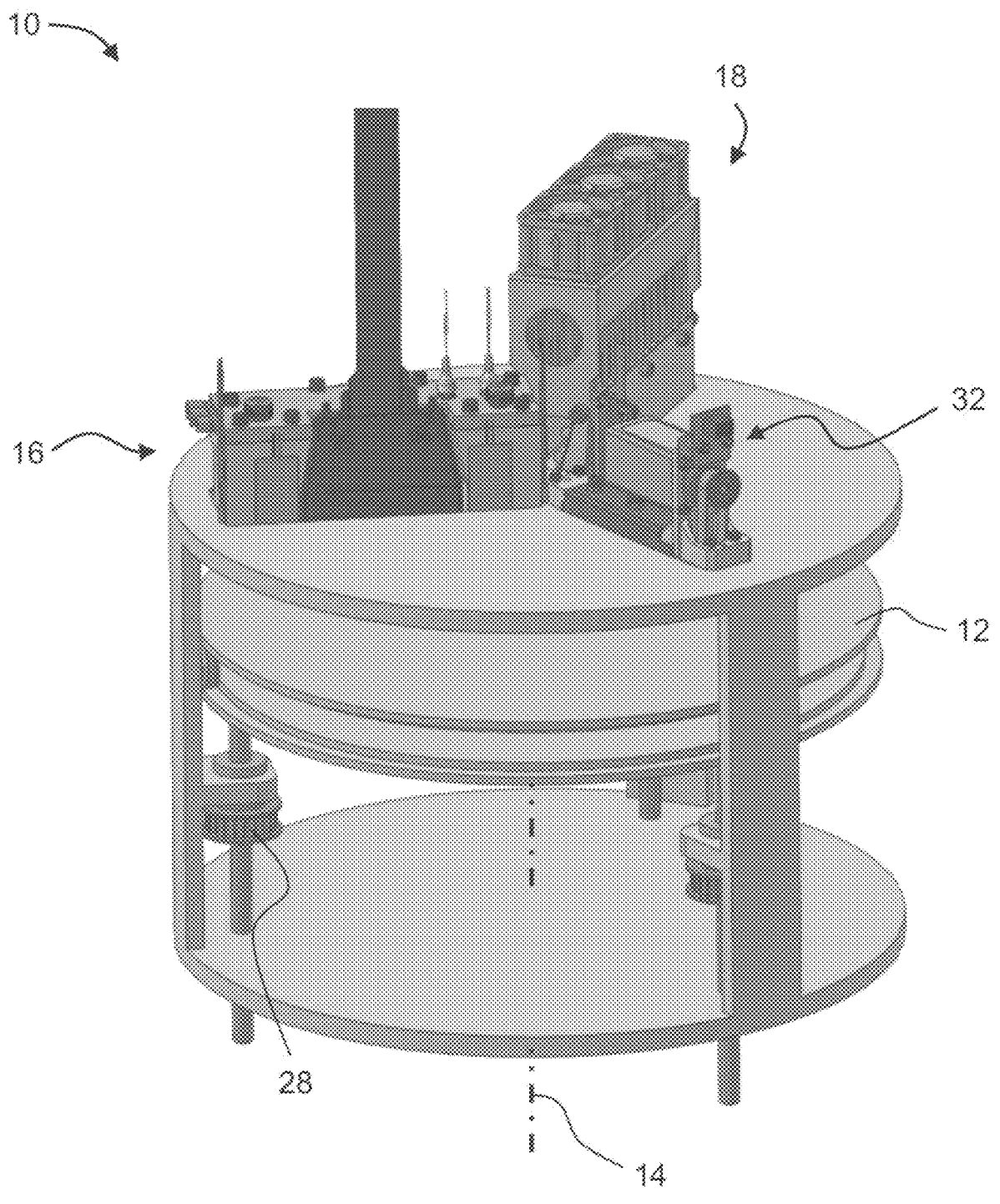

Another representative and non-limiting example of a system 10 suitable for AM of an object according to some embodiments of the present invention is illustrated in FIGS. 1B-D. FIGS. 1B-D illustrate a top view (FIG. 1B), a side view (FIG. 1C) and an isometric view (FIG. 1D) of system 10.

In the present embodiments, system 10 comprises a tray 12 and a plurality of inkjet printing heads 16, each having one or more arrays of nozzles with respective one or more pluralities of separated nozzles. The material used for the three-dimensional printing is supplied to heads 16 by building material supply system 330, with one or more liquid material containers or cartridges 430, as further detailed hereinabove. Tray 12 can have a shape of a disk or it can be annular. Non-round shapes are also contemplated, provided they can be rotated about a vertical axis.

Tray 12 and heads 16 are optionally and preferably mounted such as to allow a relative rotary motion between tray 12 and heads 16. This can be achieved by (i) configuring tray 12 to rotate about a vertical axis 14 relative to heads 16, (ii) configuring heads 16 to rotate about vertical axis 14 relative to tray 12, or (iii) configuring both tray 12 and heads 16 to rotate about vertical axis 14 but at different rotation velocities (e.g., rotation at opposite direction). While some embodiments of system 10 are described below with a particular emphasis to configuration (i) wherein the tray is a rotary tray that is configured to rotate about vertical axis 14 relative to heads 16, it is to be understood that the present application contemplates also configurations (ii) and (iii) for system 10. Any one of the embodiments of system 10 described herein can be adjusted to be applicable to any of configurations (ii) and (iii), and one of ordinary skills in the art, provided with the details described herein, would know how to make such adjustment.

In the following description, a direction parallel to tray 12 and pointing outwardly from axis 14 is referred to as the radial direction r, a direction parallel to tray 12 and perpendicular to the radial direction r is referred to herein as the azimuthal direction φ, and a direction perpendicular to tray 12 is referred to herein is the vertical direction z.

The radial direction r in system 10 enacts the indexing direction y in system 110, and the azimuthal direction φ enacts the scanning direction x in system 110. Therefore, the radial direction is interchangeably referred to herein as the indexing direction, and the azimuthal direction is interchangeably referred to herein as the scanning direction.

The term "radial position," as used herein, refers to a position on or above tray 12 at a specific distance from axis 14. When the term is used in connection to a printing head, the term refers to a position of the head which is at specific distance from axis 14. When the term is used in connection to a point on tray 12, the term corresponds to any point that belongs to a locus of points that is a circle whose radius is the specific distance from axis 14 and whose center is at axis 14.

The term "azimuthal position," as used herein, refers to a position on or above tray 12 at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersect the vertical axis 14 at a specific point.

Tray 12 serves as a building platform for three-dimensional printing. The working area on which one or objects are printed is typically, but not necessarily, smaller than the total area of tray 12. In some embodiments of the present invention the working area is annular. The working area is shown at 26. In some embodiments of the present invention tray 12 rotates continuously in the same direction throughout the formation of object, and in some embodiments of the present invention tray reverses the direction of rotation at least once (e.g., in an oscillatory manner) during the formation of the object. Tray 12 is optionally and preferably removable. Removing tray 12 can be for maintenance of system 10, or, if desired, for replacing the tray before printing a new object. In some embodiments of the present invention system 10 is provided with one or more different replacement trays (e.g., a kit of replacement trays), wherein two or more trays are designated for different types of objects (e.g., different weights) different operation modes (e.g., different rotation speeds), etc. The replacement of tray 12 can be manual or automatic, as desired. When automatic replacement is employed, system 10 comprises a tray replacement device 36 configured for removing tray 12 from its position below heads 16 and replacing it by a replacement tray (not shown). In the representative illustration of FIG. 1B tray replacement device 36 is illustrated as a drive 38 with a movable arm 40 configured to pull tray 12, but other types of tray replacement devices are also contemplated.

Exemplified embodiments for the printing head 16 are illustrated in FIGS. 2A-2C. These embodiments can be employed for any of the AM systems described above, including, without limitation, system 110 and system 10.

FIGS. 2A-B illustrate a printing head 16 with one (FIG. 2A) and two (FIG. 2B) nozzle arrays 22. The nozzles in the array are preferably aligned linearly, along a straight line. Printing head 16 is fed by a liquid material and dispenses it through the nozzle arrays 22, in response to a voltage signal applied thereto by the controller of the printing system. Head 16 is fed by a liquid material which is a building material formulation.

In embodiments in which a particular printing head has two or more linear nozzle arrays, the nozzle arrays are optionally and preferably can be parallel to each other. When a printing head has two or more arrays of nozzles (e.g., FIG. 2B) all arrays of the head can be fed with the same building material formulation, or at least two arrays of the same head can be fed with different building material formulations.

When a system similar to system 110 is employed, all printing heads 16 are optionally and preferably oriented along the indexing direction with their positions along the scanning direction being offset to one another.

When a system similar to system 10 is employed, all printing heads 16 are optionally and preferably oriented radially (parallel to the radial direction) with their azimuthal positions being offset to one another. Thus, in these embodiments, the nozzle arrays of different printing heads are not parallel to each other but are rather at an angle to each other, which angle being approximately equal to the azimuthal offset between the respective heads. For example, one head can be oriented radially and positioned at azimuthal position $\varphi 1$, and another head can be oriented radially and positioned at azimuthal position $\varphi 2$. In this example, the azimuthal offset between the two heads is $\varphi 1 - \varphi 2$, and the angle between the linear nozzle arrays of the two heads is also $\varphi 1 - \varphi 2$.

In some embodiments, two or more printing heads can be assembled to a block of printing heads, in which case the printing heads of the block are typically parallel to each other. A block including several inkjet printing heads 16a, 16b, 16c is illustrated in FIG. 2C.

In some embodiments, system 10 comprises a stabilizing structure 30 positioned below heads 16 such that tray 12 is between stabilizing structure 30 and heads 16. Stabilizing structure 30 may serve for preventing or reducing vibrations of tray 12 that may occur while inkjet printing heads 16 operate. In configurations in which printing heads 16 rotate about axis 14, stabilizing structure 30 preferably also rotates such that stabilizing structure 30 is always directly below heads 16 (with tray 12 between heads 16 and tray 12).

Tray 12 and/or printing heads 16 is optionally and preferably configured to move along the vertical direction z, parallel to vertical axis 14 so as to vary the vertical distance between tray 12 and printing heads 16. In configurations in which the vertical distance is varied by moving tray 12 along the vertical direction, stabilizing structure 30 preferably also moves vertically together with tray 12. In configurations in which the vertical distance is varied by heads 16 along the vertical direction, while maintaining the vertical position of tray 12 fixed, stabilizing structure 30 is also maintained at a fixed vertical position.

The vertical motion can be established by a vertical drive 28. Once a layer is completed, the vertical distance between tray 12 and heads 16 can be increased (e.g., tray 12 is lowered relative to heads 16) by a predetermined vertical step, according to the desired thickness of the layer subsequently to be printed. The procedure is repeated to form a three-dimensional object in a layerwise manner.

The operation of inkjet printing heads 16 and optionally and preferably also of one or more other components of system 10, e.g., the motion of tray 12, are controlled by a controller 20. The controller can have an electronic circuit and a non-volatile memory medium readable by the circuit, wherein the memory medium stores program instructions which, when read by the circuit, cause the circuit to perform control operations as further detailed below.

Controller 20 can also communicate with a host computer 24 which transmits digital data pertaining to fabrication instructions based on computer object data, e.g., in a form of a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD). The object data formats are typically structured according to a Cartesian system of coordinates. In these cases, computer 24 preferably executes a procedure for transforming the coordinates of each slice in the computer object data from a Cartesian system of coordinates into a polar system of coordinates. Computer 24 optionally and preferably transmits the fabrication instructions in terms of the transformed system of coordinates. Alternatively, computer 24 can transmit the fabrication instructions in terms of the original system of coordinates as provided by the computer object data, in which case the transformation of coordinates is executed by the circuit of controller 20.

Figure 3A:
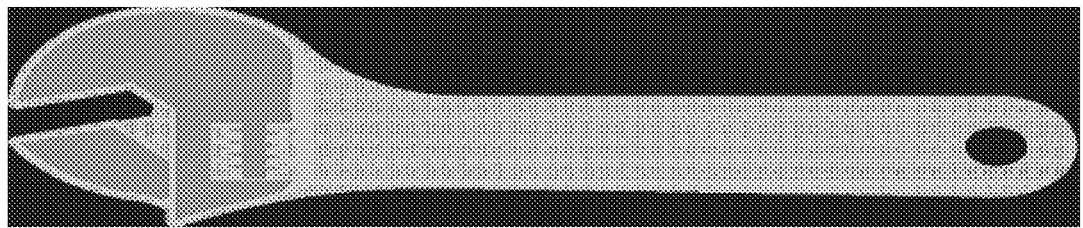
FIGS. 3A and 3B are schematic illustrations demonstrating coordinate transformations according to some embodiments of the present invention.
Figure 3B:
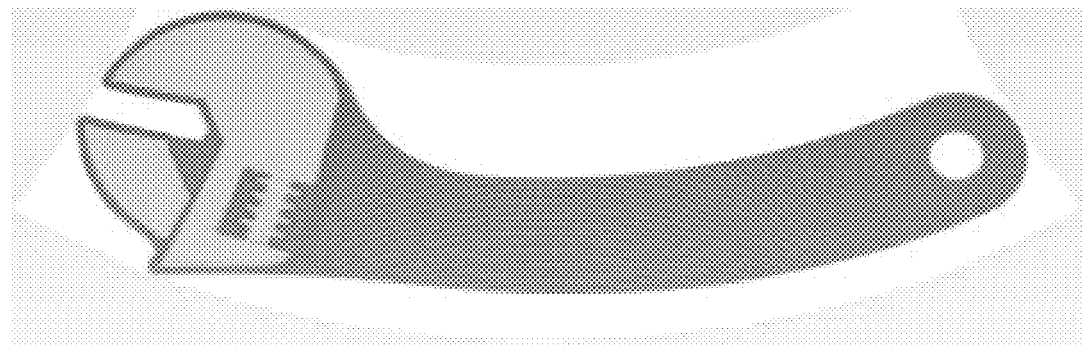

The transformation of coordinates allows three-dimensional printing over a rotating tray. In non-rotary systems with a stationary tray with the printing heads typically reciprocally move above the stationary tray along straight lines. In such systems, the printing resolution is the same at any point over the tray, provided the dispensing rates of the heads are uniform. In system 10, unlike non-rotary systems, not all the nozzles of the head points cover the same distance over tray 12 during at the same time. The transformation of coordinates is optionally and preferably executed so as to ensure equal amounts of excess material formulation at different radial positions. Representative examples of coordinate transformations according to some embodiments of the present invention are provided in FIGS. 3A-B, showing three slices of an object (each slice corresponds to fabrication instructions of a different layer of the objects), where FIG. 3A illustrates a slice in a Cartesian system of coordinates and FIG. 3B illustrates the same slice following an application of a transformation of coordinates procedure to the respective slice.

Typically, controller 20 controls the voltage applied to the respective component of the system 10 based on the fabrication instructions and based on the stored program instructions as described below.

Generally, controller 20 controls printing heads 16 to dispense, during the rotation of tray 12, droplets of building material formulation in layers, such as to print a three-dimensional object on tray 12.

System 10 optionally and preferably comprises one or more radiation sources 18, which can be, for example, an ultraviolet or visible or infrared lamp, or other sources of electromagnetic radiation, or electron beam source, depending on the modeling material formulation being used. Radiation source can include any type of radiation emitting device, including, without limitation, light emitting diode (LED), digital light processing (DLP) system, resistive lamp and the like. Radiation source 18 serves for curing or solidifying the modeling material formulation. In various exemplary embodiments of the invention the operation of radiation source 18 is controlled by controller 20 which may activate and deactivate radiation source 18 and may optionally also control the amount of radiation generated by radiation source 18.

In some embodiments of the invention, system 10 further comprises one or more leveling devices 32 which can be manufactured as a roller 326 or a blade. Leveling device 32 serves to straighten the newly formed layer prior to the formation of the successive layer thereon. In some embodiments, leveling device 32 has the shape of a conical roller positioned such that its symmetry axis 34 is tilted relative to the surface of tray 12 and its surface is parallel to the surface of the tray. This embodiment is illustrated in the side view of system 10 (FIG. 1C).

The conical roller can have the shape of a cone or a conical frustum.

The opening angle of the conical roller is preferably selected such that there is a constant ratio between the radius of the cone at any location along its axis 34 and the distance between that location and axis 14. This embodiment allows roller 32 to efficiently level the layers, since while the roller rotates, any point p on the surface of the roller has a linear velocity which is proportional (e.g., the same) to the linear velocity of the tray at a point vertically beneath point p. In some embodiments, the roller has a shape of a conical frustum having a height h, a radius $R_1$ at its closest distance from axis 14, and a radius $R_2$ at its farthest distance from axis 14, wherein the parameters h, $R_1$ and $R_2$ satisfy the relation $R_1/R_2=(R-h)/h$ and wherein R is the farthest distance of the roller from axis 14 (for example, R can be the radius of tray 12).

The operation of leveling device 32 is optionally and preferably controlled by controller 20 which may activate and deactivate leveling device 32 and may optionally also control its position along a vertical direction (parallel to axis 14) and/or a radial direction (parallel to tray 12 and pointing toward or away from axis 14.

In some embodiments of the present invention printing heads 16 are configured to reciprocally move relative to tray 12 along the radial direction r. These embodiments are useful when the lengths of the nozzle arrays 22 of heads 16 are shorter than the width along the radial direction of the working area 26 on tray 12. The motion of heads 16 along the radial direction is optionally and preferably controlled by controller 20.

Some embodiments contemplate the fabrication of an object by dispensing different material formulations from different arrays of nozzles (belonging to the same or different printing head). These embodiments provide, inter alia, the ability to select material formulations from a given number of material formulations and define desired combinations of the selected material formulations and their properties. According to the present embodiments, the spatial locations of the deposition of each material formulation with the layer is defined, either to effect occupation of different three-dimensional spatial locations by different material formulations, or to effect occupation of substantially the same three-dimensional location or adjacent three-dimensional locations by two or more different material formulations so as to allow post deposition spatial combination of the material formulations within the layer, thereby to form a composite material formulation at the respective location or locations.

Any post deposition combination or mix of modeling material formulations is contemplated. For example, once a certain material formulation is dispensed it may preserve its original properties. However, when it is dispensed simultaneously with another modeling material formulation or other dispensed material formulations which are dispensed at the same or nearby locations, a composite material formulation having a different property or properties to the dispensed material formulations may be formed.

In some embodiments of the present invention the system dispenses digital material formulation for at least one of the layers.

The phrase "digital material formulations", as used herein and in the art, describes a combination of two or more material formulations on a pixel level or voxel level such that pixels or voxels of different material formulations are interlaced with one another over a region. Such digital material formulations may exhibit new properties that are affected by the selection of types of material formulations and/or the ratio and relative spatial distribution of two or more material formulations.

As used herein, a "voxel" of a layer refers to a physical three-dimensional elementary volume within the layer that corresponds to a single pixel of a bitmap describing the layer. The size of a voxel is approximately the size of a region that is formed by a building material, once the building material is dispensed at a location corresponding to the respective pixel, leveled, and solidified.

The present embodiments thus enable the deposition of a broad range of material formulation combinations, and the fabrication of an object which may consist of multiple different combinations of material formulations, in different parts of the object, according to the properties desired to characterize each part of the object.

Further details on the principles and operations of an AM system suitable for the present embodiments are found in U.S. Pat. No. 9,031,680, the contents of which are hereby incorporated by reference.

As stated, systems 10 and 110 employ one or more liquid material containers or cartridges 430, which supply building materials to the printing heads 16. The containers 430 are loadable to the system, so that the operator may decide to unload one of the containers and replace it with another container which typically contains the same type of building material, but may also contains a different type of building material. The replacement can be done at the end of the printing process or before the printing process begins, in order not to interrupt the printing process. Thus, for example, when the system identifies, before the initiation of the printing process, that the amount of material that remained in the container after a previous printing process is insufficient for completing the fabrication of a particular object, the system can alert the operator to replace the container with a new container that is entirely filled.

The Inventors found that this solution is inconvenient, because it is not always possible to fabricate an object without interrupting the printing process, since for large printing jobs, even a container that is entirely filled may not be sufficient to complete the job and the container may be required to be replaced at a time when an operator is not available to replace the container, e.g. at night or over a weekend. The Inventors also found it inconvenient as it requires the operator to store partially filled containers that were removed from the system for future use, a situation that may repeat itself over time.

The Inventors also found that when the printing process is interrupted for too long a time, the parts of the object that are fabricated after the interruption may have a different appearance (typically different hue), compared to those parts that were fabricated before the interruption. This typically happens when the container empties while the system is operated overnight or during the weekend, requiring the systems to halt for a long time until the operator arrives to replace the empty container and printing can continue.

The Inventors have therefore devised a technique that reduces the duration of the interruption.

It is to be understood that, unless otherwise defined, the operations described hereinbelow can be executed either contemporaneously or sequentially in many combinations or orders of execution. Specifically, the ordering of the flowchart diagrams below is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

Figure 4:
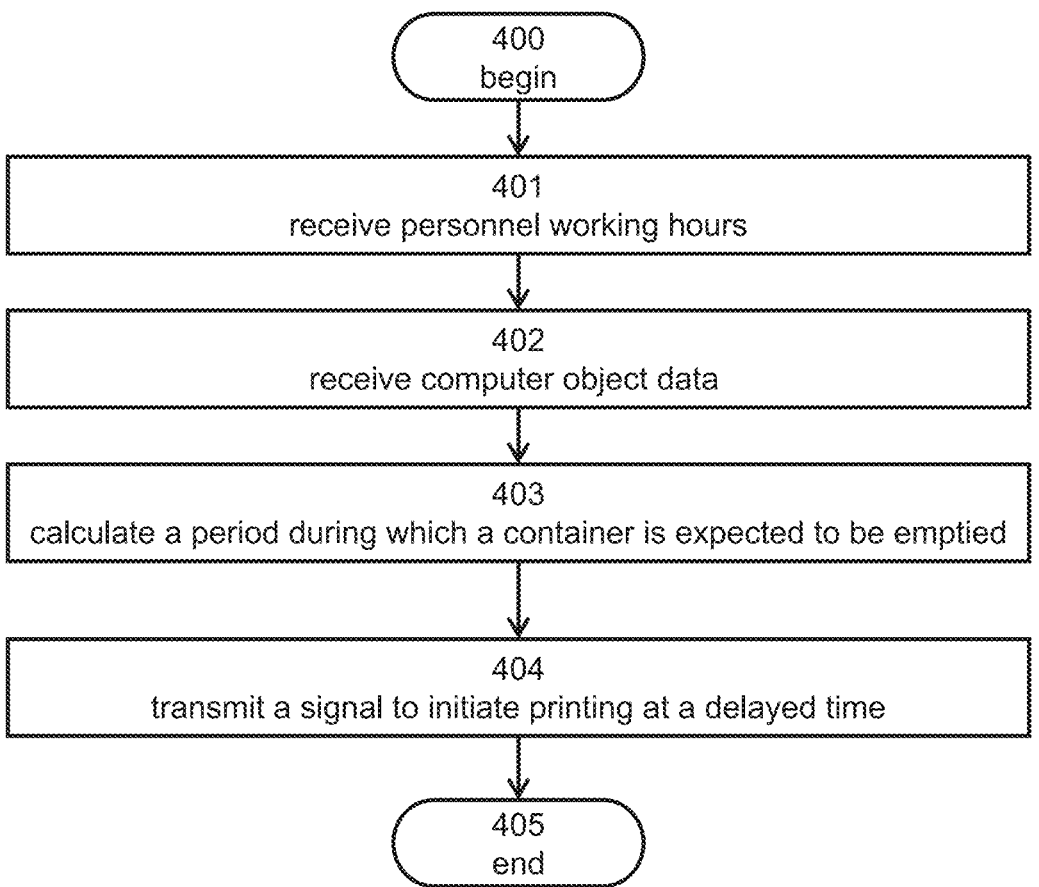
FIG. 4 is a flowchart diagram of a method suitable for printing a three-dimensional object according to various exemplary embodiments of the present invention.

FIG. 4 is a flowchart diagram of a method suitable for printing a three-dimensional object according to various exemplary embodiments of the present invention. The method can be executed by a computer of an AM system (e.g., data processor 24 of system 10 or system 110) operated by a controller (e.g., controller 20).

The method begins at 400 and optionally and preferably proceeds to 401 at which at which working hours of personnel operating the printing system is received. The working hours are typically received by a user interface, e.g., user interface 116 or the user interface of data processor 24. The working hours may alternatively be read from a computer-readable storage medium (not shown) or be transmitted to the computer over a communication network.

The method continues to 402 at which computer object data that collectively pertains to a three-dimensional shape of the object is received. For example, the computer (e.g., data processor 24) can access a computer-readable storage medium and retrieve the data from the medium. The data processor can also generate the data, or a portion thereof, instead of, or in addition to, retrieving data from the storage medium, for example, by means of computer aided design (CAD) software or computer aided manufacturing (CAM) software. The computer object data can include a plurality of graphic elements (e.g., a mesh of polygons, non-uniform rational basis splines, etc.) defining a surface of the object. In some embodiments of the present invention the graphic elements are transformed to a grid of voxels defining the shape of the object, for example, using a slicing procedure that form a plurality of slices, each comprising a plurality of voxels describing a layer of the 3D object. Alternatively, the method can receive sliced computer object data from an external source, e.g., a computer-readable medium, in which it is not necessary to execute the slicing operation. The data also include information pertaining to the type of building material(s) to be used for printing the object. The data can be in any data format known in the art, including, any of the aforementioned computer object data formats.

The computer communicates with the controller of the AM system (e.g., controller 20), to allow the computer to transfer the data to the controller. The computer can be configured to transfer all the data to the controller before the printing process begins, or to initially transfer only a portion of the data, and continue transferring during the printing process, e.g., upon a request from the controller. For example, the computer can be configured to transmit the data on a slice-by-slice basis, or in batches of two or more slices at a time.

The method proceeds to 403 at which a supply period $\Delta t_s$ is calculated. The supply period $\Delta t_s$ is defined as the time-period during which a container that contains a building material to be used in the printing process is expected to be emptied. The supply period $\Delta t_s$ can be calculated by the computer (e.g., data processor 24) based on the computer object data. In some embodiments of the present invention supply period $\Delta t_s$ is calculated based on a predetermined total amount of material in the container. For example, the computer can use a predefined parameter that expresses the total capacity of the container and use this parameter or some fraction thereof as the predetermined total amount.

Alternatively, the computer can receive input pertaining to the amount of material in the container and use this input for calculating the supply period $\Delta t_s$. The input can be received via the user interface, or it can be received as a signal from the controller of the AM system apparatus. The controller can obtain the amount of material in the container, by communicating with a device that measures the amount (e.g., a liquid level sensor in the container, or a weight measuring device, such as, but not limited to, a load cell, that measures the weight of the container).

Typically, the AM system comprises two or more containers that supply different building materials. In this case, a supply period is optionally and preferably calculated separately for each container, thereby providing a plurality of supply periods.

The method continues to 404 at which a signal to initiate printing of the object at a delayed time is transmitted to the controller of the AM system. The delayed time is selected such that an end of the supply period is within the personnel working hours. For example, suppose that at 01:00 AM on a given day the computer receives a request to print an object based on specific computer object data. Suppose further that based on the computer object data and the amount of building material in the container the computer calculates a supply period $\Delta t_s$ of 3 hours, and that the received working hours are from 9 AM to 5 PM. The computer can transmit to the controller a signal to initiate the printing of the object at a delayed time which is on or after 6 AM but not after 2 PM so as to ensure that the end of the 3-hour period falls between 9 AM and 5 PM.

When the method calculates a plurality of supply periods, the method optionally and preferably selects the delayed time to ensure that the end times of all the supply periods are within the working hours. Returning to the above example, suppose that the container the computer calculates supply period $\Delta t_s$ of 3 hours, 4 hours, 5 hours, and 6 hours, for four different containers in the AM system. In this case the computer can transmit to the controller a signal to initiate the printing of the object at a delayed time which is on or after 6 AM but not after 11 AM so as to ensure that the end of the three-hour supply period falls between 9 AM and 5 PM.

The method ends at 405.

In conventional three-dimensional printing systems several liquid containers are connected to different compartments of a printing block by separate supply conduits (see, e.g., U.S. Pat. No. 9,718,238 supra). Each of the conduits has a controllable valve having an open state which allows the material to flow to the printing block, and a closed state at which liquid flow is prevented. The controller operates the valves and the printing block to ensure that different materials are supplied simultaneously from different containers to different compartments of the printing block, allowing fabricating an object from a plurality of different building materials. The controller thus executes a printing process based on mixed instructions wherein instructions associated with one container and a respective compartment are executed together with instructions associated with another container and a respective another compartment.

The Inventors found that the printing process can be made more efficient when executed according to batches of instructions, wherein each batch is associated with one of the containers but not with any other of one of the containers. The printing process is efficient especially when each nozzle array of the printing heads of the system is connected to a single container, separately from all other nozzles, so that no two nozzle arrays receive material from the same container and no container supplies material to more than one nozzle array. In this case, the method can execute the printing instructions batches serially, each time with respect to a different nozzle array and a container which supplies material to this container. This provides efficiency from the standpoint of operational simplicity since it does not require controlling flow within furcated fluid paths between the containers and the nozzle arrays. Thus, in various exemplary embodiments of the invention the method is executed by a system which is devoid of any manifolds or valves that control flow between the containers and the nozzle arrays, and in which, for each container, there is a one-to-one non-furcated fluid communication between the container and one of nozzle arrays.

In some embodiments of the invention, the method is executed by a system (e.g., system 10 or 110) which comprises a pump 432 that controls the flow of building material from a container (e.g., container 430) to the respective nozzle array of the printing head (e.g., array 122 of head 16) that is fed by the container. Pump 432 can be of any type. In a preferred embodiment pump 432 is a peristatic pump, but other types of pumps are also contemplated.

Thus, in some embodiments of the present invention a batch of printing instructions is executed to control at least one nozzle (e.g., a nozzle array) to dispense modeling material from one container. Then, e.g., when the when the container is emptied, another batch of printing instructions is executed, but this time with respect to a different nozzle or nozzle array and with respect to a different container. The currently executed batch of printing instructions is typically a continuation of the formerly executed batch of printing instructions, except that it is associated with another container. This allows a continuous printing process of the object without interruption, and without using material from more than one container at the time.

FIGS. 5A-C is a schematic illustration of batches of printing instructions according to some embodiments of the present invention. Shown are two batches 502, 504, each being associated with one of the containers of the AM system (e.g., one of containers 430) but not with any other of the containers. It is to be understood that the number of batches can be greater than two.

Each batch includes a set of printing instructions, set 502_1, 502_2, . . . , 502_N, for batch 502, set 504_1, 504_2, . . . , 504_N, for batch 504, etc. In the illustrated embodiments, aside from being associated with different containers, batches 502, 504 are identical. However, this need not necessarily be the case, since, for some applications, it may not be necessary for the batches to include the same printing instructions. Further, it is not necessary for the batches to include the same number of instructions.

The currently executed printing instruction of the currently active batch is marked in FIGS. 5A-C by a pointer 506. Since the execution is serial, both within the batch and among the batches, there is only one pointer 506 in each of FIGS. 5A-C.

FIG. 5A represents the beginning of the printing process, wherein the first printing instruction 502_1 of the first batch 502 is executed. FIG. 5B represents a situation some time after the beginning of the printing process. The pointer 506 points to an instruction 502_i further along the batch 506. Consider a situation at which the last portion of the material in the container associated with batch 502 is used during the execution of instruction 502_i, so that after this execution the container associated with batch 502 is empty. In this case, the next (i+1) instruction is not executed by batch 502, since each batch is associated with a single specific container. Rather, the pointer 506 moves to the i+1 instruction of batch 504 (FIG. 5C) which is associated with another container, allowing the printing process to continue, substantially without interruption, although one of the containers is empty.

Figure 6A:
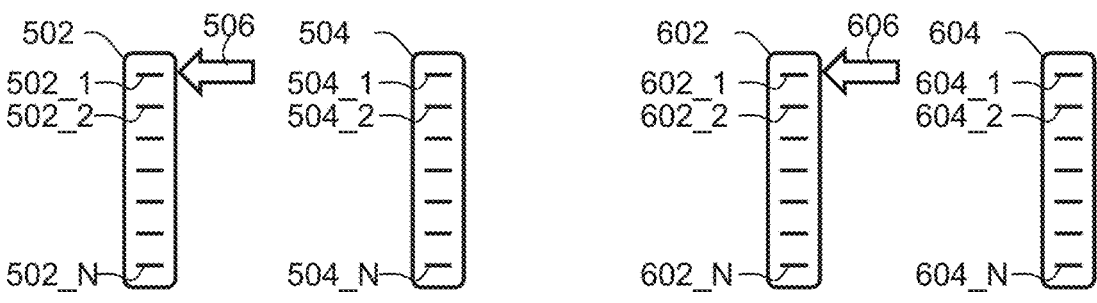
FIGS. 6A-C are schematic illustrations of batches of printing instructions in embodiments of the invention in which the batches pertain to two types of building materials.
Figure 6B:
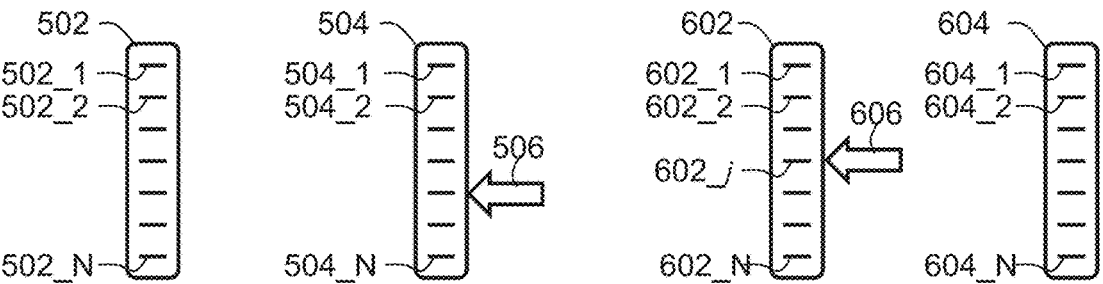
Figure 6C:
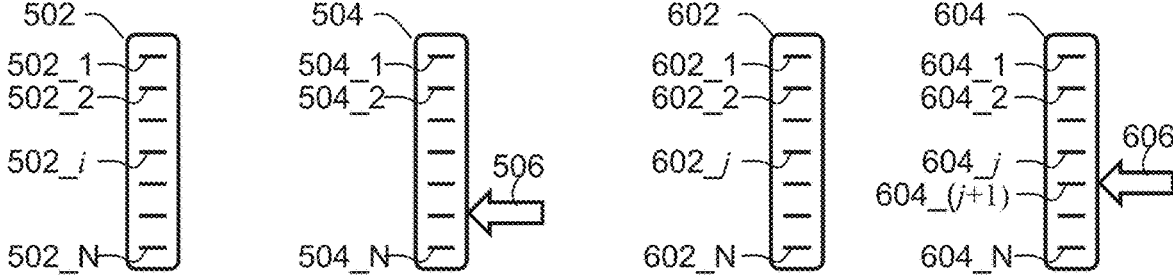

The printing process described above with reference to FIGS. 5A-C, is particularly useful when the containers that are individually associated with batches 502 and 504 (and other batches, if desired) contain the same type of building material. A representative example for such situation is an AM system including two containers that contain the same modeling material and two containers that contain a support material. A suitable procedure for this example, which is not to be considered as limiting, is illustrated in FIGS. 6A-C. In this case, one pair of batches 502 and 504 can be associated with the containers that contain the modeling material, and another pair of batches 602 and 604 can be associated with the containers that contain the support material. FIG. 6A represents the beginning of the printing process, wherein the first printing instruction 502_1 of batch 502 and the first printing instruction 602_1 of batch 602 are executed. FIG. 6B represents a situation at which some time after the beginning of the printing batch 504 is active, instead of batch 502, e.g., since the container associated with batch 502 emptied, while batch 602 is still active, e.g., since the container associated with it still contains a sufficient amount of support material. FIG. 6C represents a situation in which some time after the beginning of the printing batches 504 is still active, and batch 604 has just became active (following the execution of instruction 602_j), e.g., since the container associated with batch 602 emptied.

In some embodiments of the present invention the controller of the AM system allows selecting between two printing modes, wherein at a first printing mode each batch is executed separately for each container, and at a second printing mode one or more of the containers supplies modeling material before another one of the containers that contains modeling material is empty. The selection between the modes can be by the user, e.g., using a user interface. Alternatively, the selection can be automatic. For example, the controller can automatically select the first mode when the controller identifies a situation in which two containers that contain the same modeling material are loaded to the system. Conversely, the controller can automatically select the second mode when the controller identifies a situation in which no two containers that are loaded to the system contain the same modeling material. Identification of the type of modeling material can be done, for example, by means of identification tags or barcodes attached to the containers).

Figure 7:
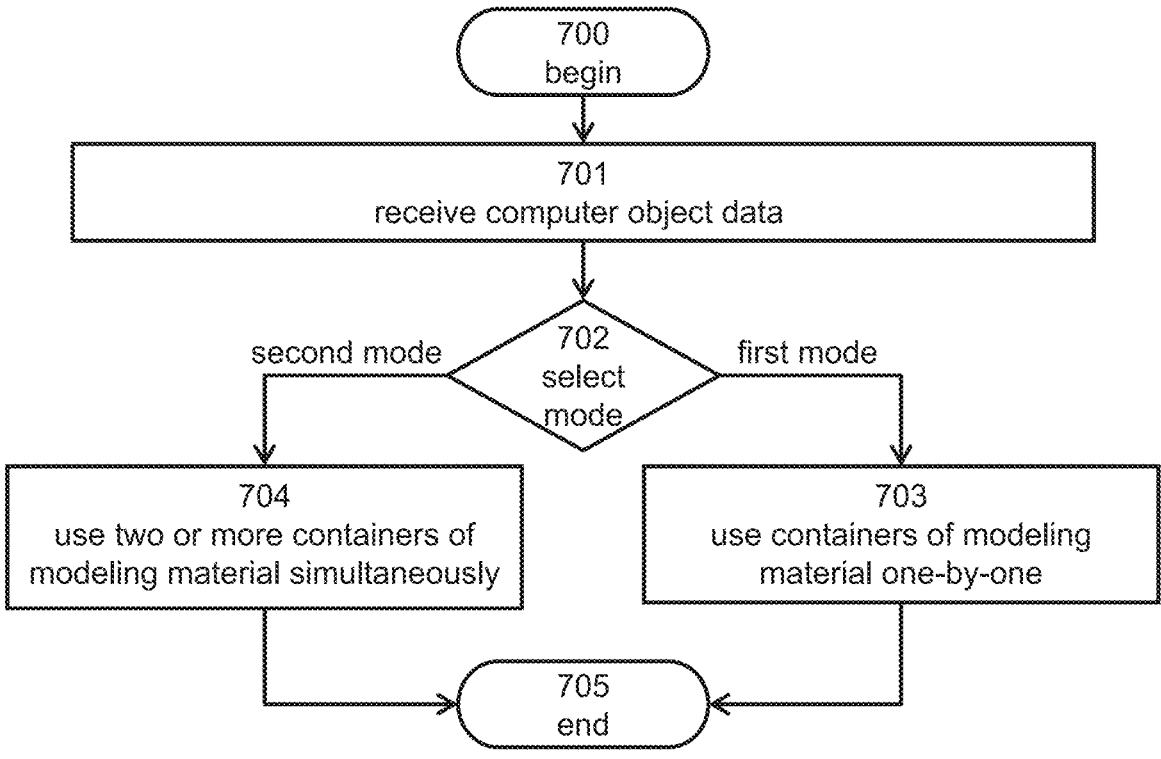
FIG. 7 is a flowchart of a method suitable for printing a three-dimensional object in an embodiment in which one of two printing modes is selected.

A flowchart of a three-dimensional printing method in an embodiment in which one of two printing modes is selected, is illustrated in FIG. 7.

The method begins at 700 and continues to 701 at which computer object data that collectively pertains to a three-dimensional shape of the object is received, as further detailed hereinabove (e.g., with respect to operation 402 of method 400). The method continues to decision 702 at which the method selects between two printing modes. The selection can be executed by the user or automatically as further detailed hereinabove. If the first mode is selected at 702, the method proceeds to 703 at which a series of printing instruction batches is executed, one batch for each container of modeling material, so that no batch is executed before a modeling material container associated with a previously executed batch is emptied. For example, at 703 the method can execute a procedure similar to the procedure described hereinabove with respect to FIGS. 5A-C. If the second mode is selected at 702, the method proceeds to 704 at which two or more modeling material containers are used simultaneously, by operating two or more nozzle arrays that dispense modeling material at the same time.

The method ends at 705 once the fabrication of the object is completed.

It is appreciated that when a rotary AM system (e.g., system 10) is employed, the relative rotary motion between the tray 12 and the printing heads 16, results in a situation in which the relative linear speed between the heads and the tray is higher for nozzles that are farther from the axis 14 of rotation than for nozzles that are closer to axis 14. Now, the rotation speed of tray 12 (or, equivalently of heads 16) is typically selected to be sufficiently high so as to allow fast freeform fabrication of objects, but yet not too high so as to reduce the effect of shape deformation of droplets due to the impact of droplets landing on a surface that is moving relative thereto.

Figure 8:
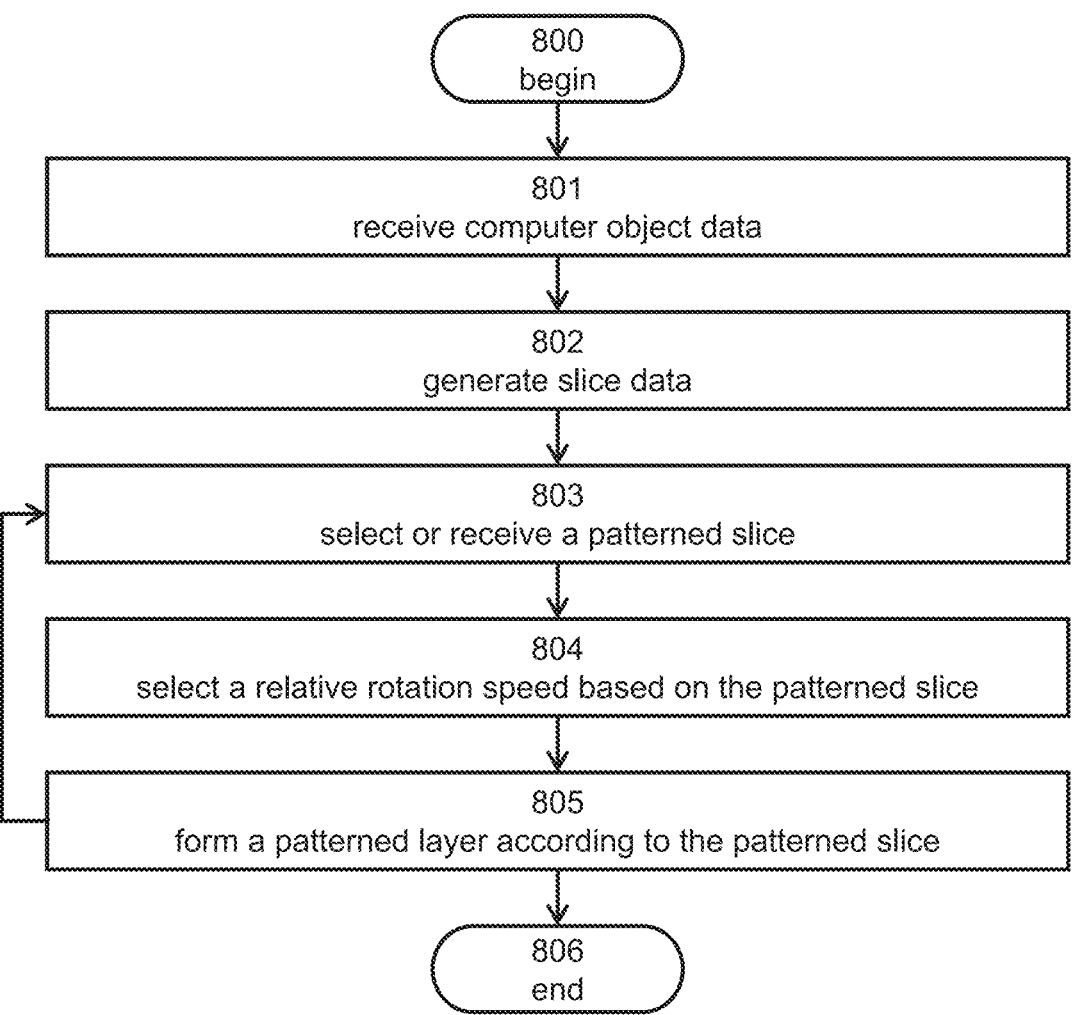
FIG. 8 is a flowchart diagram of a method suitable for printing a three-dimensional object in embodiments of the invention in which the rotation speed is selected based on computer object data.

Conventional systems vary the rotation speed of the tray responsively to the radial position of the printing heads so that when the printing heads are relocated to be closer to the axis of rotation, the rotation speed increases, and when the printing heads are relocated to be farther from the axis of rotation, the rotation speed decreases (see, e.g., Publication No. WO2016/009426 supra). The Inventors found that the printing process in rotary AM systems can be improved by considering the computer object data when selecting the relative rotation speed between the tray and the printing heads. A representative example of an improved printing method is illustrated in FIG. 8.

The method begins at 800 and optionally and preferably continues to 801 at which at which computer object data that collectively pertains to a three-dimensional shape of the object is received, as further detailed hereinabove. The method optionally and preferably continues to 802 at which slice data are generated by executing a slicing procedure which transforms the graphic elements that form the surfaces of the object to a plurality of slices, each comprising a plurality of voxels describing a layer of the object. Alternatively, the method can receive sliced computer object data from an external source, e.g., a computer-readable medium, in which it is not necessary to execute the slicing operation 802.

At 803 a patterned slice of the slices defined at 802 is selected. When 802 is not executed, the patterned slice is received from the external source. The slices are selected or received at 803 in an ordered manner from the bottommost slice to the topmost slice, as known in the art of AM.

The method proceeds to 804 at which a rotation speed of a relative rotary motion between the tray and the printing heads is selected, based on the pattern that defines the patterned slice. The rotation speed is preferably selected based on a radial position of a portion of the pattern, more preferably a portion that defines a region with the object encompassing a voxel which is farthest from the vertical axis among all voxels corresponding to the pattern. For example, the rotation speed can be selected based on a distance between the axis and the aforementioned farthest voxel.

Typically, the rotation speed is selected so as to ensure that a linear speed at the radial position of the portion of the pattern is equal to, or less than, a predetermined linear speed threshold. For example, denoting the linear speed threshold by $v_{th}$, and the distance between the axis and the radial position of the portion of the pattern by $r_e$, the method optionally and preferably calculates a rotation speed $\omega$ which is about $\omega = v_{th}/r_e$. When the portion of the pattern is the farthest voxel among the voxels of the pattern, such a selection ensures that no voxel within the pattern has a relative linear speed that exceeds the threshold $v_{th}$.

Once the rotation speed is calculated, the controller adjusts the speed of the relative rotary motion between the tray and the head to match the calculated rotation speed @, and the method proceeds to 805 at which a layer of building material, patterned according to the patterned slice, is dispensed on the tray during the relative rotary motion. Following the dispensing, the layer can be straightened and hardened as further detailed hereinabove.

In various exemplary embodiments of the invention the method selects a rotation speed that is constant, so that the relative rotary motion between the tray and the head does not vary throughout the formation of the layer. These embodiments are particularly useful when the printing head is not allowed to move along the radial direction during the formation of the layer.

Operation 805 can be repeated for the same (preferably constant) rotation speed, so that two or more layers are formed without re-adjusting the rotation speed. Alternatively, once a layer is formed at 805, the method can loop back to 803 for receiving data describing the next slice. Also contemplated, are embodiments in which the loopback is executed for a portion of the layers, so that at least two adjacent layers are formed at the same rotation speed, and at least two adjacent layers are formed at different rotation speeds. For example, the loopback can be executed every N layers, where N is a positive integer larger than 1.

In embodiments of the present invention in which the slice data are generated at 802, the method optionally and preferably generates the data such as to reduce the overall printing time of the object. Preferably, the method generates data describing a plurality of slices that are oriented, within the coordinate system of the rotating tray, such that higher portions of object (or a group of objects, when more than one object is printed during the same printing process) are closer to the rotation axis than lower portions of object. These embodiments are particularly useful when the rotation speed is calculated according to $\Phi = v_{th}/r_e$, because it increases the number of layers that are formed at a higher speed, and therefore reduces the overall printing time.

The method ends at 806.

Figure 9A:
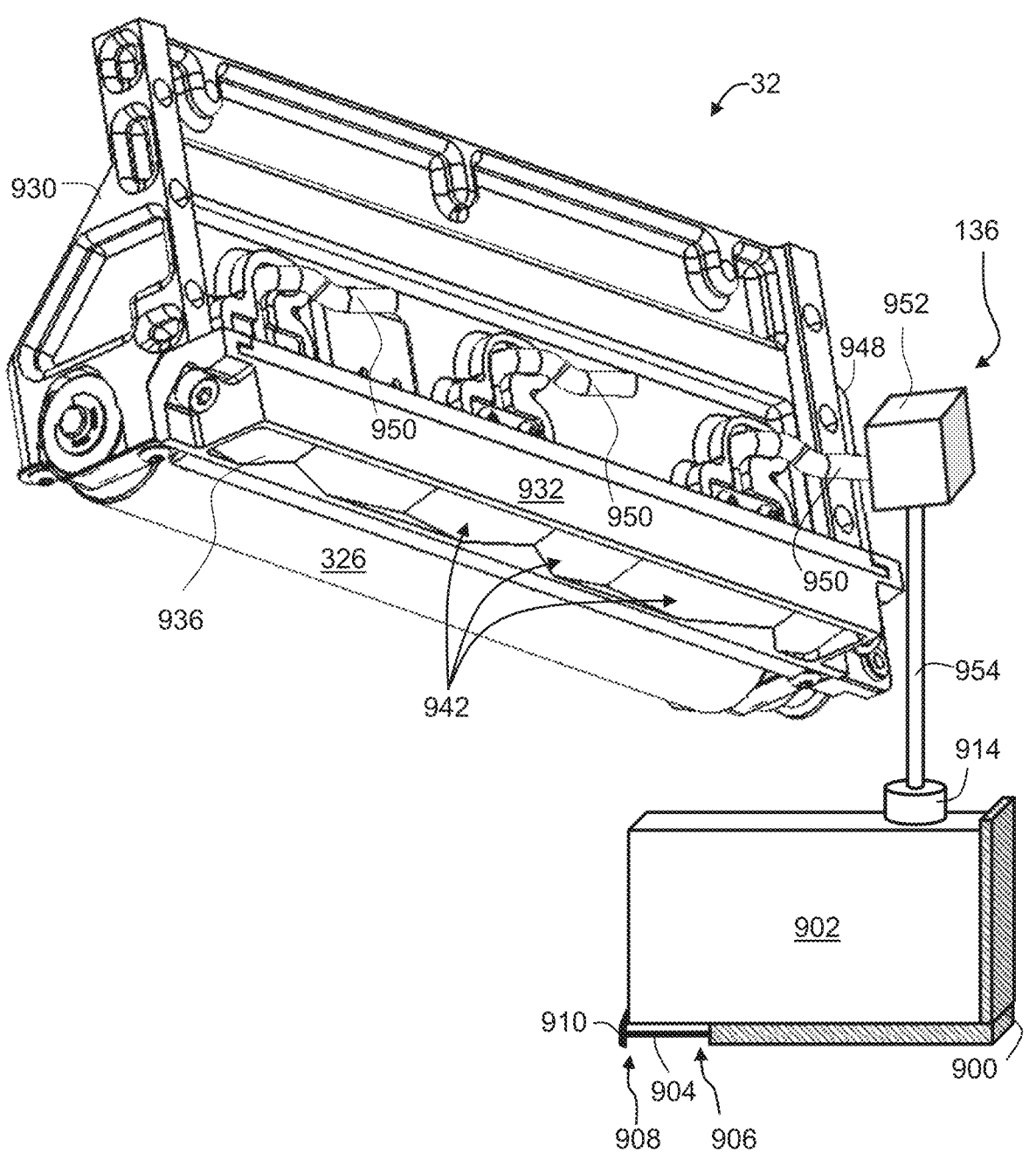
FIGS. 9A-F are schematic illustrations of embodiments of the invention which concern removal of waste from a three-dimensional printing system.
Figure 9B:
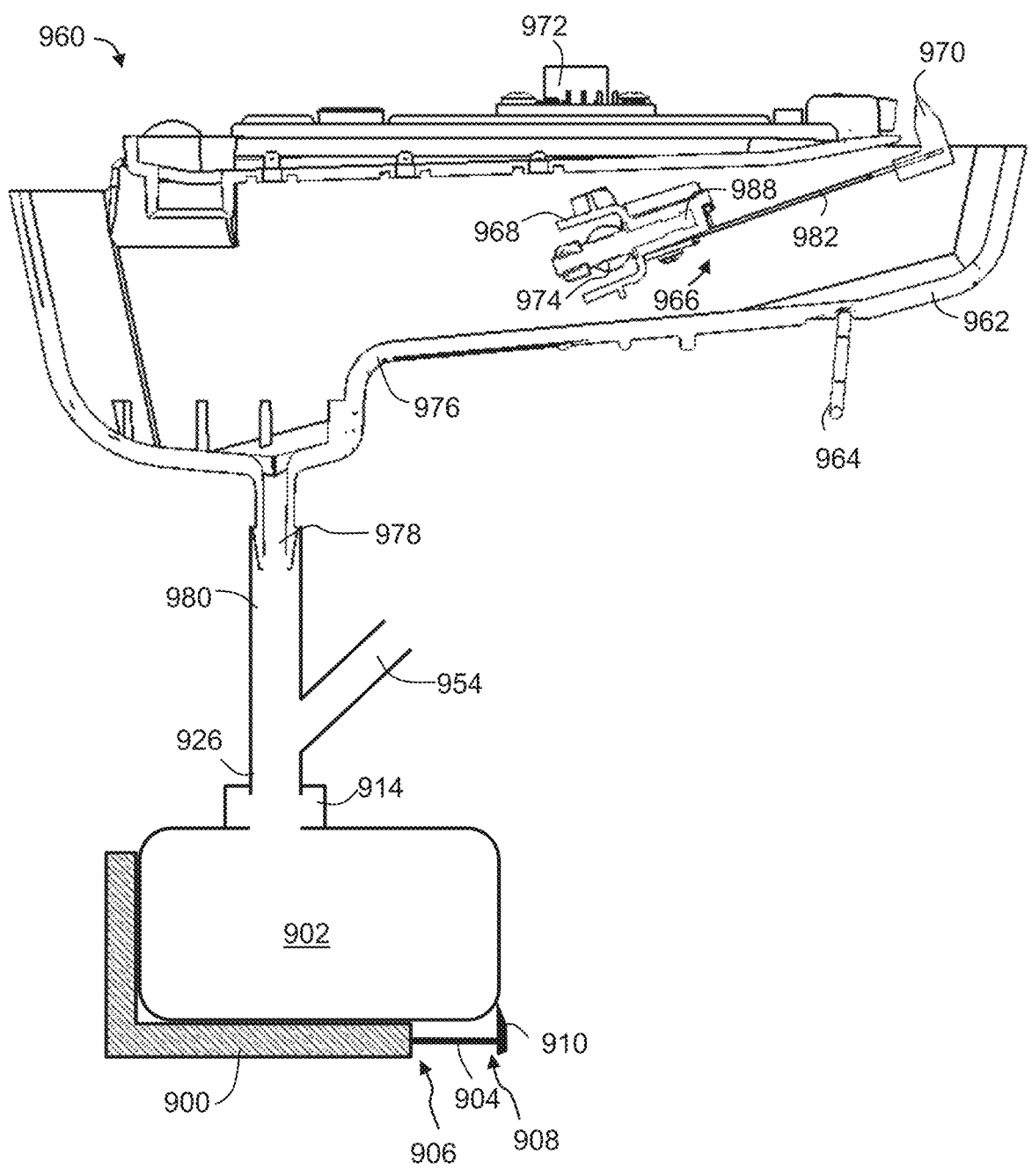

FIGS. 9A and 9B provide schematic illustrations of portions of an AM system (e.g., system 10 or 110) that are responsible for the collection of waste from the system. FIG.

9A illustrates a portion of the AM system that includes the leveling device 32 and roller 326. FIG. 9B illustrates a portion of the AM system that includes a service station system 960 for automatically performing service operations, including, without limitation, wiping a dispensing surface of a printing head (e.g., orifice plate 121), and collecting liquid building material wiped off, or purged by, the dispensing surface of the printing head.

Referring to FIG. 9A, in preferred embodiments of the invention, leveling system 32 comprises roller 326, and waste collecting device 136 which includes a bath 932, a blade 934 (not shown, see FIG. 1A) for removing waste from roller 326 into bath 932, and a plurality of tubular structures 950. Bath 932 is preferably elongated. Preferably, the length of bath 932 is at least the length of roller 326. Tubular structures 950 serve as a mechanism for delivering building material from bath 932 to a waste cartridge 902, for example, by means of a pump system 952, which is optionally and preferably controlled by the controller of the printing system (e.g., controller 20), and which can establish fluid communication to cartridge 902 by a waste conduit 954. While FIG. 9A illustrates an embodiment in which waste conduit 954 arrives at the upper part of cartridge 902 from above, embodiments in which the waste conduit arrives from below are also contemplated (see waste conduit 926 in FIG. 9F). Waste cartridge 902 is optionally and preferably mounted on a waste cartridge nest 900. Pump system 952 can be embodied as a single pump with a plurality of inlet ports, e.g., in the form of a manifold, that are connected to the outlets of structures 450. Alternatively, pump system 972 can be embodied as a plurality of separate pumps, wherein two or more of the pumps are connected to a separate tubular structure 450.

In various exemplary embodiments of the invention the base 936 of bath 932 comprises a plurality of separated depression regions 942. In these embodiments, the inlets of the tubular structures 950 are located in the depression regions 942. Depression regions 942 serve as liquid collectors allowing liquid building material to flow into regions 942 by means of gravity. Depression regions 942 can be constituted in any shape. For example, base 936 can be a non-planar surface having a wavy shape, in which case depression regions 942 are troughs of the wavy shape. The wavy shape need not be curved. In the embodiments illustrated in FIG. 9A, for example, the non-planar surface of base 936 comprises a plurality of oblique segments forming the wavy shape. Other shapes for the depression regions 942 are also contemplated. For example, a depression region 942 can have the shape of a well, with vertical walls, or slanted walls, or stepped walls, or curved walls.

Referring to FIG. 9B, service station system 960 comprises a bath 962, having a bottom 976, which is optionally and preferably slanted and provided with an outlet port 978. Preferably, but not necessarily, bath 962 has a fast-release connector 964 for supporting bath 962 such that its top is generally horizontal. Fast-release connector 964 can comprise, for example, a latch assembly, or a snap-type connector as desired. When connector 964 is a latch assembly, it optionally and preferably comprises a bent elastic wire, such as, but not limited to, a bent metallic wire, shaped to support bath 962 from below.

Service station system 960 also comprises a wiper assembly 966, having a wiping element 970 configured to wipe a dispensing face of one or more printing heads (e.g., orifice plate 121 of heads 16) while the printing head reciprocally moves above bath 962.

Wiper element 970 can be oriented generally perpendicular to an indexing direction of the three-dimensional printing system. These embodiments are particularly useful when a rotary system is employed (e.g., system 10), in which case the head(s) move to the location of service station 960 along the radial direction (see FIG. 1B), so that wiper element 970, which is oriented generally along the azimuthal direction, wipes the dispensing surface on the head while the head enters the service station zone. In the embodiments in which element 970 is perpendicular to the indexing direction, the width of wiper element 970 is optionally and preferably at least the width of all the printing heads of printing system. This allows the same wiper element 970 to wipe all the heads of the printing system.

Wiper element 970 can alternatively be oriented generally parallel to the indexing direction of the three-dimensional printing system. These embodiments are particularly useful when a linearly reciprocal system is employed (e.g., system 110), in which case the head(s) move to the location of service station 960 along the scanning direction, so that wiper element 970, which is oriented generally along the indexing direction, wipes the dispensing surface on the head while the head enters the service station zone. In the embodiments in which element 970 is generally parallel to the indexing direction, the width of wiper device is optionally and preferably at least the length of the printing head. This allows the same wiper element 970 to wipe the entire nozzle array of the printing system.

In use of service station system 960, the controller of the printing system moves the printing head to the location of service station system 960, above bath 962. During the motion of the head over bath 962, wiper element 970 engages the dispensing surface of the head to remove excess building material that may have been accumulated thereon. The excess material drips as liquid waste from wiper element 970 into bath 962. The liquid waste can be removed from bath 962 into waste cartridge 902, through outlet port 978, e.g., by means of a pump (not shown) or by gravity. Fluid communication between cartridge 902 and port 978 can be established by a service station waste conduit 980. FIG. 9B illustrates an embodiment in which waste conduit 980 arrives at the upper part of cartridge 902 from above. Embodiments in which the waste conduit arrives from below are illustrated in FIG. 9F (see waste conduit 926). While the printing head is above bath 962, the controller can also instruct the printing head to execute a purging procedure. For example, the purging procedure can be executed before changing the building material container that feeds the head, so as to remove the previous building material from the head's channel or other fluid paths in the system. In this case, bath 962 also collects the purged material, which can be thereafter evacuated into waste cartridge 902 via the outlet port 978.

In some embodiments of the present invention, wiper assembly 966 comprises a wiper base 968, wherein wiper element 970 is detachably connected wiper base 968. The advantage of these embodiments is that they allow easy replacement of wiper element 970, without the need to disassemble service station system 960 from the printing system. Wiper base 968 is mounted on an axis 974, which passes through bath 962 and which is optionally and preferably rotatable. In some embodiments of the present invention the wiper base 968 is mounted on axis 974 by a shaft 988. In these embodiments, shaft 988 is rotatable, independently from, and perpendicularly to, the rotation of axis 974 by motor 424. The advantage of allowing shaft 988 to rotate perpendicularly to axis 974 is that it provides wiper element 970 with two rotational degrees of freedom thereby improving the ability to align wiper element 970 with the dispensing surface of the printing head, hence improving also the wiping efficiency. The advantage of allowing shaft 988 to rotate independently of axis 974 is that it provides the wiper element 970 with a self-aligning property. Specifically, by slightly pressing wiper element 970 against the dispensing surface of the printing head, wiper element 970 becomes aligned with the dispensing surface via the independent rotation of shaft 988. Preferably, shaft 988 is tilted with respect to a horizontal direction. The tilt allows adjustment of wiper element 970 to engage the dispensing surface of the printing head by rotating axis 974.

In some embodiments of the present invention wiper base 968 is shaped as, or comprises, a shield structure for shielding a connection between shaft 988 and axis 974 from liquid building material wiped by wiper device or purged by the printing head. The inventors found that the shield structure reduces rotation failures of shaft 988 relative to axis 974.

Wiping element 970 preferably has a wiping end that is substantially straight and continuous throughout its width. Preferably, wiping element 970 is elastomeric. Suitable elastomers for wiping element 970 are elastomers characterized by a Shore A hardness of from about 70 to about 90.

Shore A Hardness, which is also referred to as Shore hardness or simply as hardness, describes a material's resistance to permanent indentation, defined by type A durometer scale. Shore hardness is typically determined according to ASTM D2240.

Representative types of elastomers suitable for the present embodiments including, without limitation, synthetic rubber, such as, but not limited to, ethylene propylene diene.

In some embodiments of the present invention the wiping element 970 (e.g., the elastomeric wiping element) is connected to an elastic non-polymeric planar structure 982, such as, but not limited to, a metallic planar structure. Structure 982 adds an additional degree of freedom to the aforementioned self-aligning property since the elastic forces may realign wiping element 970 with the dispensing surface of the head in case of a temporary misalignment, e.g., due to excessive accumulation of material on the head. Structure 982 also increases the lifetime of wiping element 970 since it maintains sufficient pressure of element 970 on the head even when element is about to become worn.

FIGS. 9C-9F illustrate waste cartridge 902 and waste cartridge nest 900 in greater detail. Waste cartridge nest 900 comprises a cartridge latching member 904 for latching waste cartridge 902 in the nest 900 once cartridge 902 is pushed forward into the nest. Cartridge latching member 904 can be of any type, including, without limitation, a coil spring, a cantilever beam, a ramp, a bolt, a snap connector, or the like, and can be mounted to engage the cartridge below the cartridge, and/or above the cartridge, and/or at one or more of its sides, as desired.

Figure 9C:
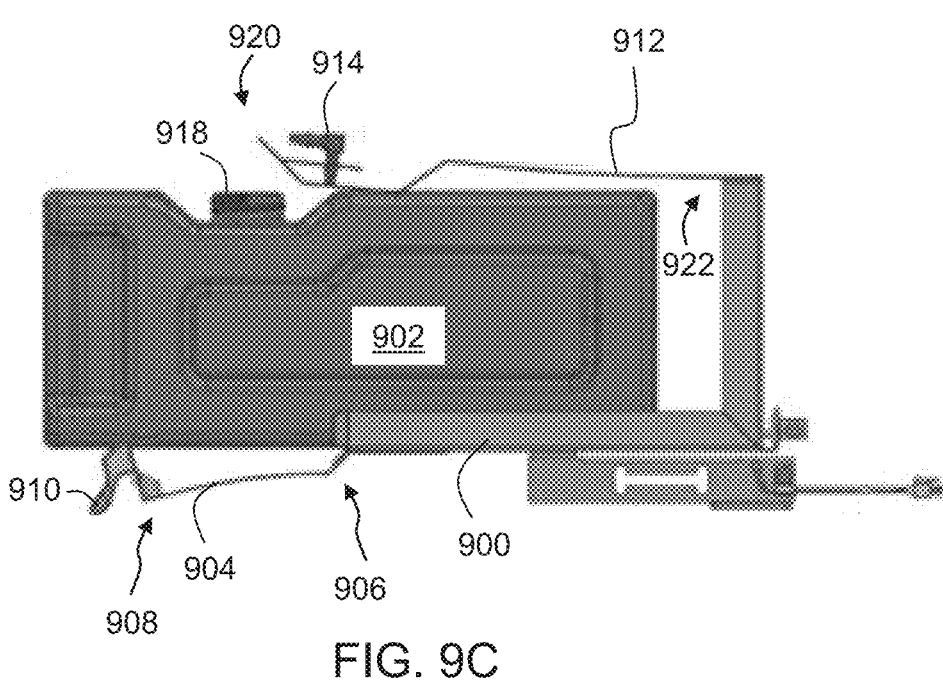
Figure 9D:
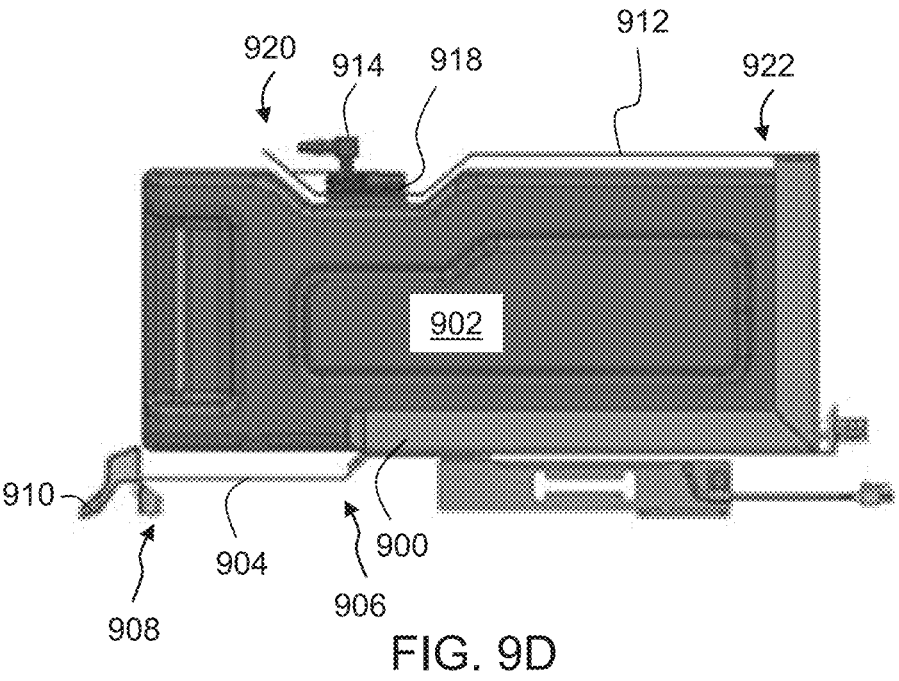
Figure 9E:
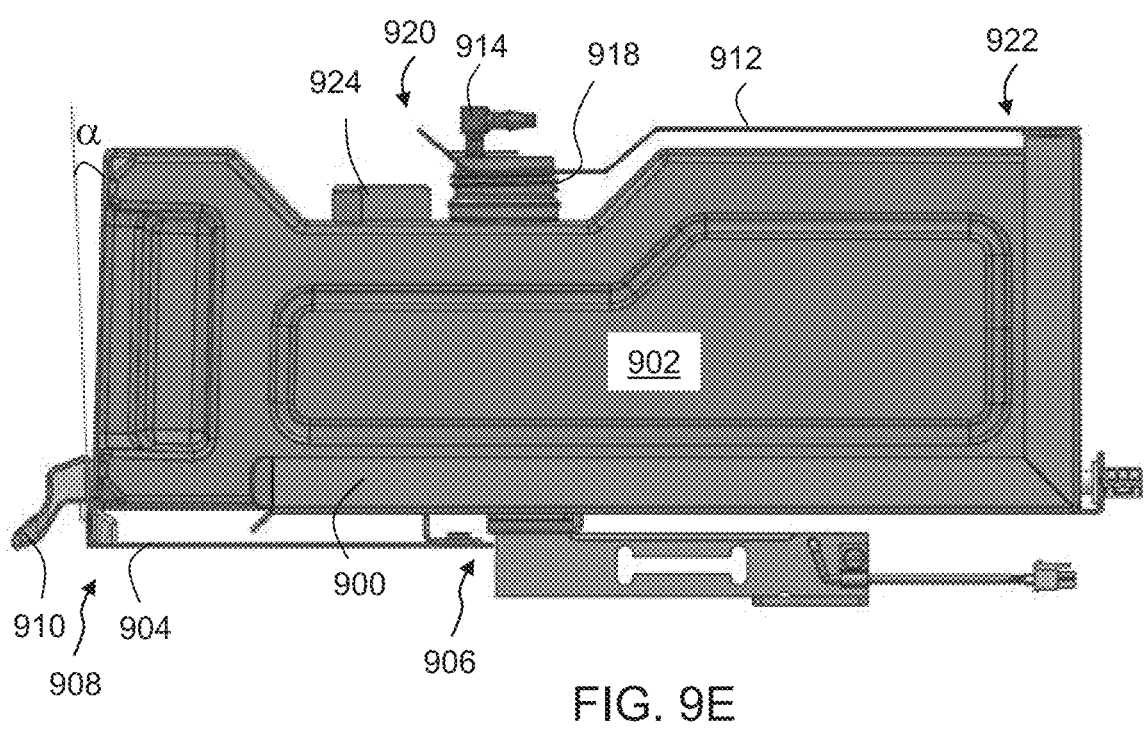
Figure 9F:
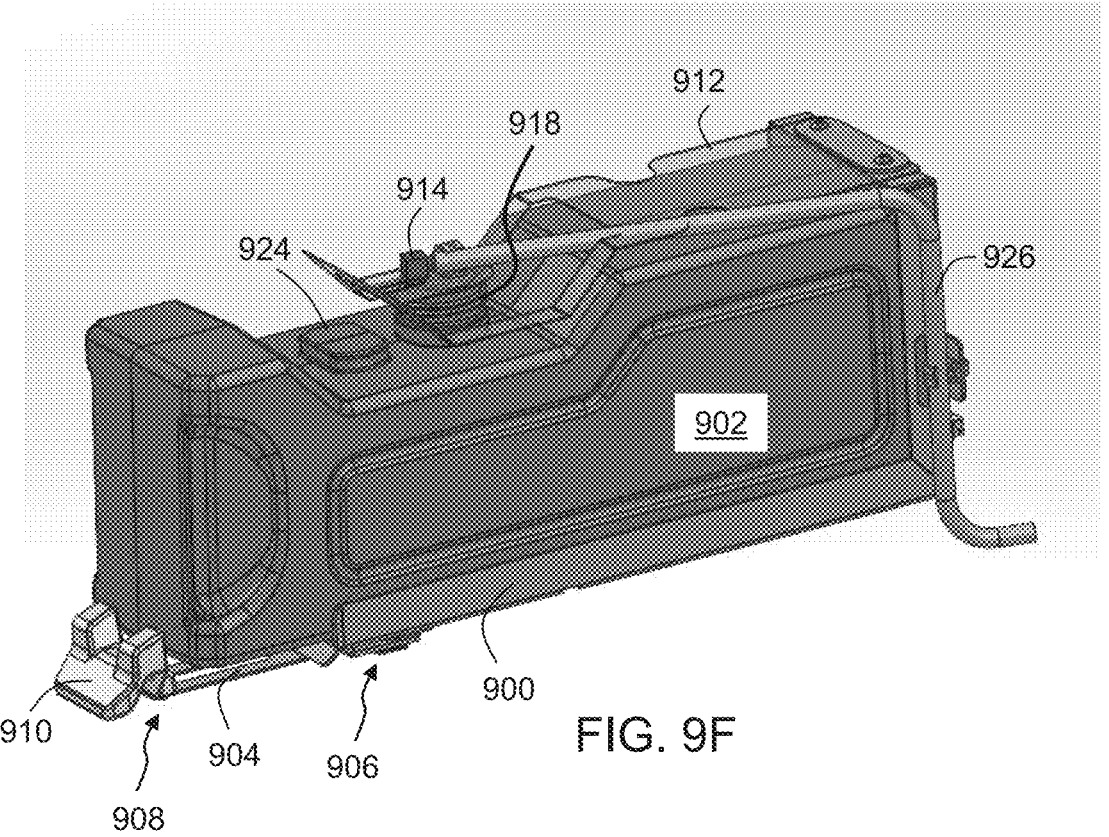

In the representative example shown in FIGS. 9C-E the latching member is embodied as an clastic cantilever beam which has a fixed end 906 and a free end 908, and which is configured to bend in its loaded state (FIG. 9C) and to straighten in its relaxed state (FIG. 9D). Cantilever beam 904 can be mounted at the bottom part of the nest to such that when cartridge 902 is in the nest, beam 904 is below cartridge. Cantilever beam 904 can be provided with an anchor 910 at its free end 908. To load cartridge 902 into nest 900, a bending load is applied to beam 904 (e.g., downwards, as illustrated in FIG. 9C) so that anchor 908 allows cartridge 902 to slide into nest 900. Cartridge 902 is then pushed forward into nest 900 (FIG. 9D). When cartridge 902 is in its final position within the nest 900, the bending load is released, cantilever 904 straightens, and anchor 910 prevents a reverse motion of cartridge 902. The bending load can be applied by cartridge 902 itself, in which case anchor 910 contacts cartridge 902 while cartridge 902 slides into the nest, as illustrated in FIG. 9C. Preferably, once cartridge 902 is in its final position within the nest 900, its front wall is slanted at an angle α with respect to the vertical direction (FIG. 9E). Typical value for a is from about 1° to about 5°, e.g., about 2°. To unload cartridge 902, a bending load is applied to anchor 910 (e.g., downwards) and cartridge 902 is pulled out of the nest.

Waste cartridge nest 900 also comprises and an inlet port engagement member 912 carrying a fluid connector 914. Once cartridge 902 is pushed forward into nest 900, engagement member 912 ensures that connector 914 sealingly engages an inlet port 918 of cartridge 902. Inlet port engagement member 912 can be embodied as a coil spring, a cantilever beam, a ramp, a bolt, a snap connector, or the like. In the representative example shown in FIGS. 9C-F engagement member 912 is embodied as a cantilever beam which has a fixed end 920 and a free end 922, and which is configured to bend in its loaded state (FIG. 9C) and to straighten in its relaxed state (FIG. 9D). Connector 914 is mounted at the free end 920 of beam 912.

Preferably, connector 914 is connected to a waste collection device (e.g., leveling system 32 and/or service station system 960, see FIGS. 9A and 9B) both when waste cartridge 902 occupies nest 900 and when waste cartridge 902 is pulled away from nest 900. When connector 914 connects to more than one waste collection device (for example, both to leveling system 32 and/or service station system 960), the conduits from each of the collection devices (e.g., conduits 954, 980) can be connected to a single conduit 926 (FIG. 9B), and connector 914 can connect to conduit 926.

In some embodiments of the present invention waste cartridge 902 is provided with a cork 924 compatible with inlet port 918. During delivery of waste cartridge 902, cork 924 seals inlet port 918. Prior to the loading of cartridge 902 to nest 900 cork 924 is optionally and preferably mounted at a dedicated location on the body of cartridge 902 which is laterally displaced from inlet port 918, as illustrated in FIGS. 9E and 9F. After the unloading of cartridge 902 from nest 900, cork 924 is removed from the dedicated location and is placed on port 918 to seal the waste material in cartridge 902.

Figures 10, 11A, 11B, 11C, 11D, 11E:
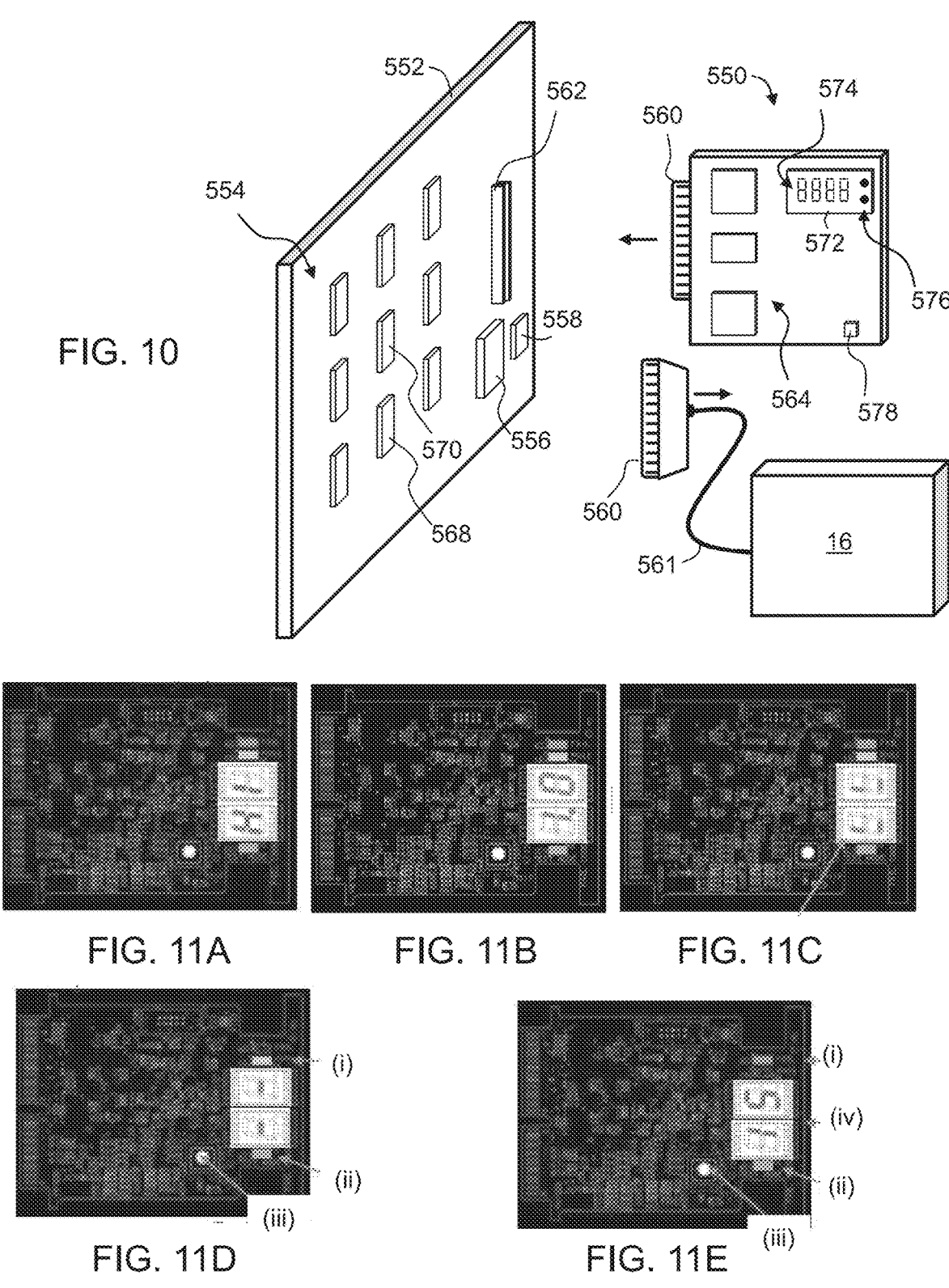
FIG. 10 is a schematic illustration of an integrated circuit for testing a printing head board of a printing head of a three-dimensional printing system, according to some embodiments of the present invention.
FIGS. 11A-E are images of a prototype integrated circuit prepared according to some embodiments of the present invention.

FIG. 10 is a schematic illustration of an integrated circuit 550 for testing a printing head board 552 of a printing head 16 of a three-dimensional printing system, such as, but not limited to, AM system 10 or 110, according to some embodiments of the present invention. Printing head board 552 includes a socket 562 that is compatible with, and detachably connectable to, an edge connector 560 that is in electrical communication with integrated circuit 550, or an edge connector 560 that is in electrical communication with head 16, either directly, or, as illustrated in FIG. 10, by means of a data cable 561. In the illustrated embodiment, edge connectors 560 and socket 562 are disconnected.

Board 552 includes driving elements 554 that receive signals from the controller (e.g., controller 20) of the AM system which are responsible for the operation of head 16, including, without limitation, dispensing of building material droplets and at least one of: heating, temperature monitoring, clocking, and the like. In some embodiments of the present invention board 554 also comprises a memory medium 558 and microprocessor 556, and the controller of the AM system is configured to communicate with microprocessor 556. In these embodiments, one or more of driving elements 554 receive operating signal from microprocessor 556 and not directly from the controller of the AM system. Memory medium 558 is used by microprocessor 556 for storing and retrieving parameters and printing instructions.

Integrated circuit 550 is detachably connectable to socket 562 of printing head board 552 by means an edge connector which is of the same type as edge connector 560 of head 16, and which is also designated in FIG. 10 by reference sign 560. Prior to the use of integrated circuit 550, head 16 is pulled out of board 552 by detaching edge connector 560 of head 16 from socket 562, and the edge connector 560 of integrated circuit 550 is pushed into socket 562 thus establishing electrical communication between circuit 550 and board 552.

Integrated circuit 550 also comprises circuitry 564 configured for automatically switching the printing head board 552 to a testing mode at which printing head 16 is not dispensing material, for transmitting test signals to board 552, and for receiving response signals from board 552. For example, circuitry 564 can transmit a test signal to memory medium 558, and/or a test signal to one or more heating elements 570 on board 552, and/or a test signal mimicking a voltage supply to board 552, and/or a test signal mimicking a dispensing pulse, and/or a test signal mimicking a data signal, and the like. In some embodiments of the present invention printing head board 552 also comprises one or more thermistors 568, in which case circuitry 564 can transmit a test signal to thermistors 568. In various exemplary embodiments of the invention circuitry 564 configured for automatically transmitting all the test signals without user intervention. Optionally, circuit 550 comprises an activation control 578 (e.g., push button) for initializing and/or re-executing the test.

Integrated circuit 550 optionally and preferably also comprises a visible indication panel 572 for generating optical signals pertaining to a condition of the printing head board 552 based on the response signals received by circuitry 564. Indication panel 572 can be a display, typically configured to display indicia 574, symbols, or graphic elements, from which the user can identify the condition of board 552, for example, using a look up table or the like. Panel 574 optionally and preferably provide a code indicative of a pin number of socket 562 that is associated with a potentially faulty component of board 554. In some embodiments of the present invention panel 572 include one or more LED indicators 576 for providing additional indication, e.g., a fail/pass indication and/or power on/off indication.

As used herein the term "about" refers to ±10%

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Exemplified Circuit for Testing Printing Head Board

An integrated circuit for testing a printing head board of a printing head was fabricated according to some embodiments of the present invention.

FIG. 11A is an image of the integrated circuit, immediately after being mounted on socket 562. The indication panel displays indication that the integrated circuit is properly inserted to the socket. FIG. 11B is an image of the integrated circuit, about one second after being mounted on the socket. The indication panel displays information pertaining to the version number of the circuitry. FIG. 11C is an image of the integrated circuit, about two seconds after being mounted on the socket. The indication panel displays running indicia (arrow) that indicate that the test is being executed. FIG. 11D is an image of the integrated circuit, after the completion of the text, in case the board is operational. Arrows (i) and (ii) mark LED indicators pertaining to the result of the test and the power status, respectively, and arrow (iii) mark a push button for re-exacting the test, if desired. FIG. 11E is an image of the integrated circuit, after the completion of the text, in case the test failed. In FIG. 11E the display indicates a fail code [arrow (iv)] which allows the operator to determine which component is not functional.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for three-dimensional printing, comprising:
a three-dimensional printing apparatus configured for printing an object using a building material supplied from a container;
a computer, configured to receive working hours of personnel operating said apparatus, to calculate, based on three-dimensional printing data describing said object, a supply period during which said container is expected to be emptied, and to transmit to said apparatus a signal to initiate said printing at a delayed time selected to ensure that an end time of said supply period is within said working hours;
wherein said apparatus comprises a plurality of containers, each supplying a different building material, and wherein said computer is configured to calculate the supply period, separately for each container, thereby providing a plurality of supply periods, and to transmit to said apparatus the signal to initiate said printing at the delayed time selected to ensure that the end time of each of said supply periods is within said working hours.

2. The system according to claim 1, wherein said computer is configured to calculate said supply period based on a predetermined total amount of material in said container.

3. The system according to claim 1, wherein said computer is configured to receive input pertaining to an amount of material in said container, and to calculate said supply period based on said input amount.

4. The system according to claim 3, wherein said computer is configured to receive said input via a user interface.

5. The system according to claim 3, wherein said computer is configured to receive from said apparatus a signal indicative of said amount.

6. The system of claim 1, wherein said three-dimensional printing apparatus comprises:
at least one printing nozzle;
a plurality of modeling material containers; and
a controller configured to execute a series of printing instruction batches to control said printing nozzle to dispense patterns of modeling material according to a shape of an object, wherein each batch is associated with one of said containers but not with any other of said containers, and wherein no batch is executed before a container associated with a previously executed batch is emptied.

7. The system according to claim 6, wherein said controller is configured to select between a first printing mode at which said series of printing instruction batches is executed, and a second printing mode at which at least one of said containers supplies modeling material before another one of said containers is empty.

8. The system according to claim 7, wherein said controller is configured to automatically select said first mode when said modeling material containers comprise the same modeling material.

9. The system according to claim 7, wherein said controller is configured to automatically select said second mode when said modeling material containers different modeling materials.

10. The system according to claim 7, wherein said controller is configured to select between said first and said second printing modes based on a user input.

11. The system according to claim 6, wherein said three-dimensional printing apparatus comprises a plurality of separate nozzle arrays, each separately connected to a single container of said containers, wherein each batch comprise printing instructions for said controller to operate a single nozzle array.

12. A method for three-dimensional printing, comprising:
receiving working hours of personnel operating a three-dimensional printing apparatus having a building material container;
receiving three-dimensional printing data describing an object;
calculating based on said data, a supply period during which said container is expected to be emptied;
transmitting to said apparatus a signal to initiate printing of said object at a delayed time selected to ensure that an end time of said supply period is within said working hours;
wherein said apparatus comprises a plurality of containers, each supplying a different building material, and wherein the method comprises calculating the supply period, separately for each container, thereby providing a plurality of supply periods, and transmitting to said apparatus the signal to initiate said printing at the delayed time selected to ensure that the end time of each of said supply periods is within said working hours.

13. The method according to claim 12, wherein said calculating said supply period is based on a predetermined total amount of material in said container.

14. The method according to claim 12, comprising receiving input pertaining to an amount of material in said container, wherein said calculating said supply period is based on said input amount.

15. The method according to claim 14, wherein said receiving said input is by a user interface.

16. The method according to claim 14, wherein said receiving said input comprises receiving from said apparatus a signal indicative of said amount.

17. The method of claim 12, wherein there is a plurality of building material containers and said building materials are modeling materials, and the method comprises:
selecting a container of said plurality of building material containers;
executing a batch of printing instructions to control at least one printing nozzle to dispense modeling material from said selected container in patterns corresponding to a shape of an object; and when said selected container is empty, selecting another container from said plurality of modeling material containers, and repeating said execution of said batch of printing instructions for said other container.

18. The method according to claim 17, comprising selecting between a first printing mode at which said batch of printing instructions is executed separately for each container, and a second printing mode at which at least one of said containers supplies modeling material before another one of said containers is empty.

\* \* \* \* \*